(12) United States Patent
Shimizu et al.

(10) Patent No.: US 7,113,700 B2
(45) Date of Patent: Sep. 26, 2006

(54) OPTICAL TRANSMISSION SYSTEM

(75) Inventors: Yoshihiro Shimizu, Kawasaki (JP); Makoto Takakuwa, Kawasaki (JP); Shoji Yoshida, Kawasaki (JP); Tooru Matsumoto, Kawasaki (JP); Akio Morimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 703 days.

(21) Appl. No.: 10/372,080

(22) Filed: Feb. 25, 2003

(65) Prior Publication Data

US 2003/0223751 A1    Dec. 4, 2003

(30) Foreign Application Priority Data

Jun. 3, 2002    (JP)    ............... 2002-161129

(51) Int. Cl.
H04B 10/08    (2006.01)
H04B 15/00    (2006.01)
H04B 10/22    (2006.01)
(52) U.S. Cl. ............... 398/33; 398/7; 398/34; 398/79; 398/140; 398/3; 398/4; 398/59; 398/156; 398/162; 398/25; 398/27; 398/136; 372/34; 372/35; 372/36; 372/38.02
(58) Field of Classification Search ............. 398/7, 398/34, 79, 140, 3, 4, 59, 156, 162, 25, 27, 398/33, 136
See application file for complete search history.

(56) References Cited

U.S. PATENT DOCUMENTS 6,031,644 A * 2/2000 Utsumi ............... 398/27
6,742,154 B1 * 5/2004 Barnard ............... 714/752
6,868,200 B1 * 3/2005 Kimotsuki et al. ....... 385/24
2001/0000194 A1 4/2001 Sequeira
2002/0026432 A1 * 2/2002 Kiji ............... 706/14
2002/0048062 A1 4/2002 Sakamoto et al.
2004/0208561 A1 * 10/2004 Kinoshita et al. ....... 398/59

OTHER PUBLICATIONS

Japanese Patent Abstract No.: 2001-053683 dated Feb. 23, 2001.
Japanese Patent Abstract No.: 2001-251245 dated Sep. 14, 2001.

* cited by examiner

*Primary Examiner*—Kenneth Vanderpuye
*Assistant Examiner*—Danny Wai Lun Leung
(74) *Attorney, Agent, or Firm*—Staas & Halsey LLP

(57) ABSTRACT

An optical transmission system includes an optical wavelength branching unit that shifts a wavelength transmission band in the short-wavelength or long-wavelength directions based on a branching filter operation temperature, and performs a branching operation on a wavelength-multiplexed signal. A reception transponder performs decoding on an error correction code. An error correction monitoring unit gathers an error correction amount upon which a branching filter temperature control unit sets the branching filter operation temperature. A transmission transponder performs encoding on an error correction code. An optical wavelength combining unit shifts the wavelength transmission band in the opposite direction from the shifting direction based on a combining filter operation temperature, to perform a combining operation on optical signals and output a wavelength-multiplexed optical signal. A combining filter temperature control unit sets the combining filter operation temperature based on the error correction amount sent from the optical reception device.

7 Claims, 21 Drawing Sheets

OPTICAL TRANSMISSION SYSTEM

BACKGROUND OF THE INVENTION

(1) Field of the Invention

The present invention relates to optical transmission systems, and more particularly, to an optical transmission system that performs WDM (Wavelength Division Multiplex) optical transmission.

(2) Description of the Related Art

Optical communication network techniques form the core of multimedia communication, and there is an increasing demand for better service that covers a wider area. As the number of Internet users has drastically increased in recent years, the transmission capacity has also sharply increased. In a conventional transmission system that transmits an optical signal of one wavelength through a single fiber-optic cable, the transmission capacity is not large enough. With such an insufficient transmission capacity, data transmission involving video data takes a user a long time.

As a technique of utilizing already available fiber-optic cables, a WDM technique has been developed. In WDM transmission, lights of different wavelengths are multiplexed, and signals of a plurality of channels are simultaneously transmitted through a single fiber-optic cable.

FIG. 20 shows the structure of a WDM ring network. Nodes 301 through 304 that perform WDM transmission are connected to one another with a fiber-optic cable, and thus constitute a ring structure. A plurality of SONET/SDH transmission devices 301a through 301d are connected to the nodes 301 through 304, respectively, and perform OADM (Optical Add Drop Multiplex) control.

The nodes 301 through 304 each multiplexes a signal "Added" by each corresponding one of the transmission devices 301a through 301d, so as to transmit the signals through the single fiber-optic cable within the ring. Each of the nodes 301 through 304 also performs photodisintegration on signals transmitted within the ring, and then "Drops" the signals onto the transmission devices 301a through 301d.

FIG. 21 shows the structure of the nodes that perform OADM control. The node 301 includes an optical switch 301-1 and an AWG (Arrayed wave-guide Grating) device 301-2. The node 302 includes an optical switch 302-1 and an AWG device 302-2.

The optical switch 301-1 of the node 301 performs a switching operation on an optical signal transmitted within the ring and an optical signal to be "Added" or "Dropped" to the transmission device 301a. The AWG device 301-2 performs a combining operation on optical signals outputted from the optical switch 301-1 so as to generate a wavelength-multiplexed signal. The AWG device 301-2 then outputs the wavelength-multiplexed signal onto the fiber-optic cable.

The AWG 302-2 of the node 302 performs a branching operation on a received wavelength-multiplexed signal. The optical switch 302-1 performs a switching operation on a branched optical signal and an optical signal to be "Added" or "Dropped" to the transmission device 302a.

In the above manner, the WDM network performs OADM control on each node, and generates and transmits a wavelength-multiplexed signal with the AWG device that performs optical wavelength combining and branching operations. The WDM network thus performs optical communication.

The above described AWG devices are essential in construction of a WDM network. A conventional AWG device is formed by an optical circuit employing optical waveguides of quartz glass (that are suitable for mass production, and therefore are often employed in WDM systems). Such a conventional AWG device divides optical signals of different wavelengths by the wavelength.

AWG devices can be classified into two types: one is a Gaussian type exhibiting a Gaussian waveform as the transmission characteristics (or the loss characteristics), and the other is a flat top type exhibiting a flat waveform. In general, flat top type AWG devices are employed in high-speed and large-capacity WDM networks.

However, each flat top type AWG does not have a completely flat optical spectrum, and causes small distortions in practice. Accordingly, distortions accumulate in an optical signal that has passed through a plurality of flat top type AWG devices via a plurality of nodes.

As a result, the flatness is lost at the center wavelength and in the vicinity of the center wavelength of the unit wavelength, and the transmission quality degrades. Accordingly, in each conventional WDM network employing flat top type AWG devices, the number of nodes to be provided is limited, so as to prevent transmission quality degradation (i.e., so as not to lose the flatness of the optical spectrum) Because of the limited number of nodes to be provided, an optical network having a high operation efficiency could not be constructed.

Meanwhile, the flatness of each AWG device can be improved by employing a large number of optical filters. However, this leads to a large loss, and requires an optical amplifier for compensating such a loss. Accordingly, employing a large number of optical filters results in higher production costs, as well as optical S/N degradation due to the accumulation of optical noise.

Furthermore, in a case where the flatness is measured by a spectrum analyzer on the reception end so as to perform a feedback control operation, it is necessary to prepare a wideband test light source, such as a white light source, and a spectrum analyzer on the transmission side.

SUMMARY OF THE INVENTION

Taking into consideration the above, it is an object of the present invention to provide an optical transmission system of an increased transmission quality having improved AWG transmission characteristics in the entire network through a simple control operation at low costs.

The above object of the present invention is achieved by an optical transmission system that performs WDM optical transmission. This optical transmission system includes:

an optical transmission device that includes: a transmission transponder that performs encoding on an error correction code for an optical signal at each wavelength; an optical wavelength combining unit that shifts a wavelength transmission band in the opposite direction from the shifting direction of a reception side based on a combining filter operation temperature, so as to perform a combining operation on optical signals and output a wavelength-multiplexed optical signal; and a combining filter temperature control unit that sets the combining filter operation temperature based on an error correction amount sent from the reception side; and an optical reception device that includes: an optical wavelength branching unit that shifts a wavelength transmission band in a short wavelength direction or a long wavelength direction based on a branching filter operation temperature, and performs a branching operation on a wavelength-multiplexed optical signal; a reception transponder that performs decoding on an error correction code for an optical signal at each wavelength; an error correction monitoring unit that gathers an error correction amount from the reception transponder; and a branching filter temperature control unit that sets the branching filter operation temperature based on the gathered error correction amount.

The above object of the present invention is also achieved by an optical transmission system that performs WDM optical transmission. This optical transmission system includes:

an optical transmission device that includes: an optical wavelength combining unit that performs a combining operation on optical signals, and outputs a wavelength-multiplexed optical signal; an optical variable attenuator; a correction filter that corrects distortions in accordance with distortion information, the distortions having been caused at the optical wavelength combining unit and an optical wavelength branching unit that performs a branching operation on a wavelength-multiplexed optical signal; and an optical performance information receiving unit that receives optical performance information, and outputs an attenuation adjust instruction and the distortion information to the optical variable attenuator; and an optical reception device that includes: the optical wavelength branching unit; and an optical performance monitoring unit that measures the bit error rate and the optical level of an optical signal at each wavelength, and outputs the optical performance information.

The above object of the present invention is also achieved by an optical network system that performs WDM optical transmission. This optical network system includes:

a node that includes: an optical transmission unit including a transmission transponder that performs encoding on an error correction code for an optical signal at each wavelength, an optical wavelength combining unit that shifts a wavelength transmission band in the opposite direction from the shifting direction on a reception side based on a combining filter operation temperature so as to perform a combining operation on optical signals and output a wavelength-multiplexed optical signal, and a combining filter temperature control unit that sets the combining filter operation temperature based on an error correction amount sent from the reception side; and an optical reception unit including an optical wavelength branching unit that shifts a wavelength transmission band in a short-wavelength direction or a long-wavelength direction based on a branching filter operation temperature so as to perform a branching operation on a wavelength-multiplexed optical signal, a reception transponder that performs decoding on an error correction code for an optical signal at each wavelength, an error correction monitoring unit that gathers an error correction amount from the reception transponder, and a branching filter temperature control unit that sets the branching filter operation temperature based on the gathered error correction amount, the node performing at least either one of an OADM control operation to carry out "Add"/"Drop" on an optical signal or an optical cross-connect control operation; and an optical transmission medium that connects a plurality of nodes of said type.

The above object of the present invention is also achieved by an optical transmission method for performing WDM optical transmission control. This optical transmission method includes the steps of:

gathering an error correction amount by decoding an error correction code for an optical signal at each wavelength on a transmission side;

setting a branching filter operation temperature based on the error correction amount;

performing a branching operation on a wavelength-multiplexed optical signal by shifting a wavelength transmission band in a short-wavelength direction or a long-wavelength direction based on the branching filter operation temperature;

setting a combining filter operation temperature based on the error correction amount;

performing a combining operation on optical signals to output a wavelength-multiplexed optical signal, by shifting a wavelength transmission band in the opposite direction from the shifting direction on a reception side based on the combining filter operation temperature;

storing the smallest value of the error correction amount; and flattening the transmission characteristics of an optical signal by shift-setting an operation temperature as an optimum value based on the smallest value.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

The following is a description of embodiments of the present invention, with reference to the accompanying drawings.

Figure 1:
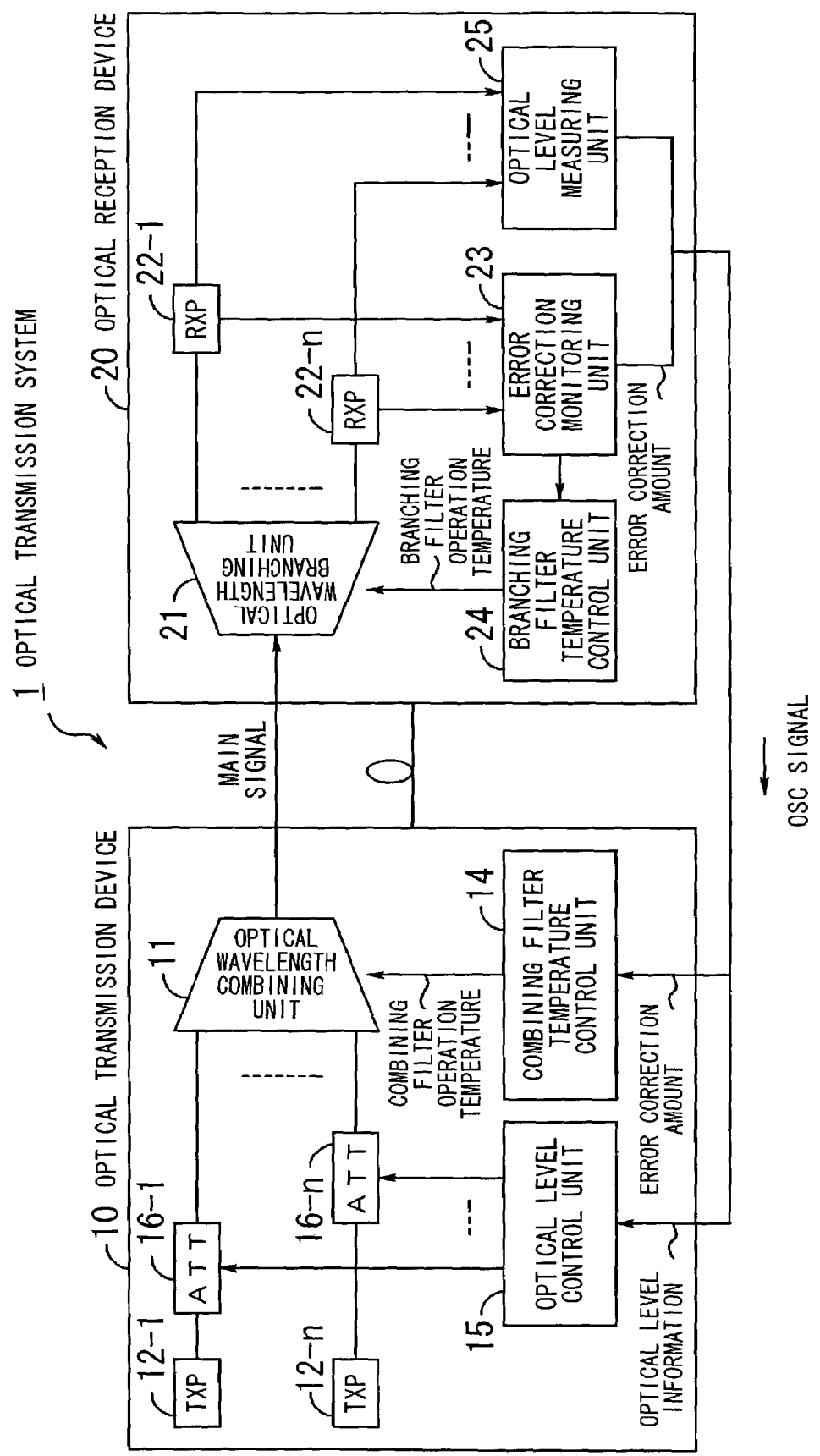
FIG. 1 illustrates the principles of an optical transmission system according to the present invention.

FIG. 1 illustrates the principles of an optical transmission system according to the present invention. An optical transmission system 1 includes an optical transmission device 10 and an optical reception device 20, and performs WDM optical transmission.

The functions of the optical transmission device 10 and the optical reception device 20 of the present invention are actually incorporated into the same device (i.e., a node). These devices are connected with a fiber-optic cable that is the mating line of the self line.

The optical reception device 20 includes an optical wavelength branching unit 21. The optical wavelength branching unit 21 has a flat top type AWG device serving as a branching filter for the optical reception device 20, and receives a wavelength-multiplexed main signal and performs a branching operation by the wavelength. In this case, the optical wavelength branching unit 21 performs a branching operation by shifting the wavelength transmission band stepwise by the unit in the short wavelength direction or the long wavelength direction, based on a branching filter operation temperature (i.e., the operation temperature of the optical wavelength branching unit 21). The same effects can be obtained by shifting the loss band, but, hereinafter, the band to be shifted will be collectively referred to as the "transmission band".

The transmission wavelength of the AWG device varies with temperatures, because of the temperature dependency of the refraction factor of quartz glass. More specifically, the center wavelength has temperature dependency, and the optical transmission system 1 of the present invention utilizes this temperature dependency to shift the transmission band.

Reception transponders 22-1 through 22-n each receives an optical signal that has been branched by the wavelength at the optical wavelength branching unit 21. Each of the reception transponders 22-1 through 22-n then detects an error correction code that has been added at the optical transmission device 10 (i.e., performing FEC (Forward Error Correction) decoding).

An error correction monitoring unit 23 gathers the amount of optical signal error correction with respect to each wavelength from the reception transponders 22-1 through 22-n. Here, as described earlier, distortions have accumulated in each optical signal that has passed through a plurality of flat top type AWG devices while going through a plurality of nodes, and the transmission quality thus has degraded. The error correction monitoring unit 23 gathers the amount of error correction that increases with a decrease in the transmission quality, with respect to each of optical signals of wavelengths λ1 through λn.

A branching filter temperature control unit 24 includes a Pertier device and a heater, and sets the branching filter operation temperature based on the amount of error correction. The branching filter temperature control unit 24 holds a reference table that shows the relationship between the amount of error correction and the set temperature. In accordance with the reference table, the operation temperature for the optical wavelength branching unit 21 is adjusted so that the amount of error correction decreases.

An optical level measuring unit 25 measures the optical level of each optical signal received by the reception transponders 22-1 through 22-n, and generates optical level information.

In WDM communication, other than the main signal, there is an optical control signal that is referred to as an OSC (Optical Supervisory Channel) of 1 MHz to 150 MHz. The error correction monitoring unit 23 and the optical level measuring unit 25 inserts the amount of error correction and the optical level information into the OSM line, and transmits them to the optical transmission device 10.

With respect to the optical transmission device 10, an optical wavelength combining unit 11 has a flat top type AWG device that serves as a combining filter. Based on a combining filter operation temperature (i.e., the operation temperature of the optical wavelength combining unit 11), the optical wavelength combining unit 11 shifts the transmission band stepwise by the unit in the opposite direction from the shifting direction of the optical reception device 20. The optical wavelength combining unit 11 then performs a combining operation on optical signals, and outputs a wavelength-multiplexed optical signal.

In a case where the optical branching unit 21 of the optical reception device 20 shifts the transmission band in the short wavelength direction, for example, the optical wavelength combining unit 11 shifts the transmission band in the long wavelength direction. In a case where the optical wavelength branching unit 21 shifts the transmission band in the long wavelength direction, the optical wavelength combining unit 11 shifts the transmission band in the short wavelength direction. In either case, the amount of shift by the optical reception device 20 is equal to the amount of shift by the optical transmission device 10.

A combining filter temperature control unit 14 includes a Pertier device and a heater, and sets the combining filter operation temperature based on the amount of error correction transmitted from the optical reception device 20. The combining filter temperature control unit 14 holds a reference table that shows the relationship between the amount of error correction and the set temperature. In accordance with the reference table, the operation temperature for the optical wavelength combining unit 11 is adjusted so that the amount of error correction decreases.

Transmission transponders 12-1 through 12-n each adds an error correction code to an optical signal corresponding to each wavelength (i.e., performing FEC encoding). In pursuance of instructions from the optical level control unit 15, optical variable attenuators 16-1 through 16-n each adjusts the attenuation of the optical signal transmitted from each corresponding one of the transmission transponders 12-1 through 12-n, and transmits the adjusted optical signal to the optical wavelength combining unit 11.

Based on the optical level information transmitted from the optical reception device 20, the optical level control unit 15 issues instructions to the optical variable attenuators 16-1 through 16-n to adjust the optical level. The flattening process for the transmission band by the temperature control operation according to the present invention will be described later with reference to FIGS. 6 through 8.

Figure 2:
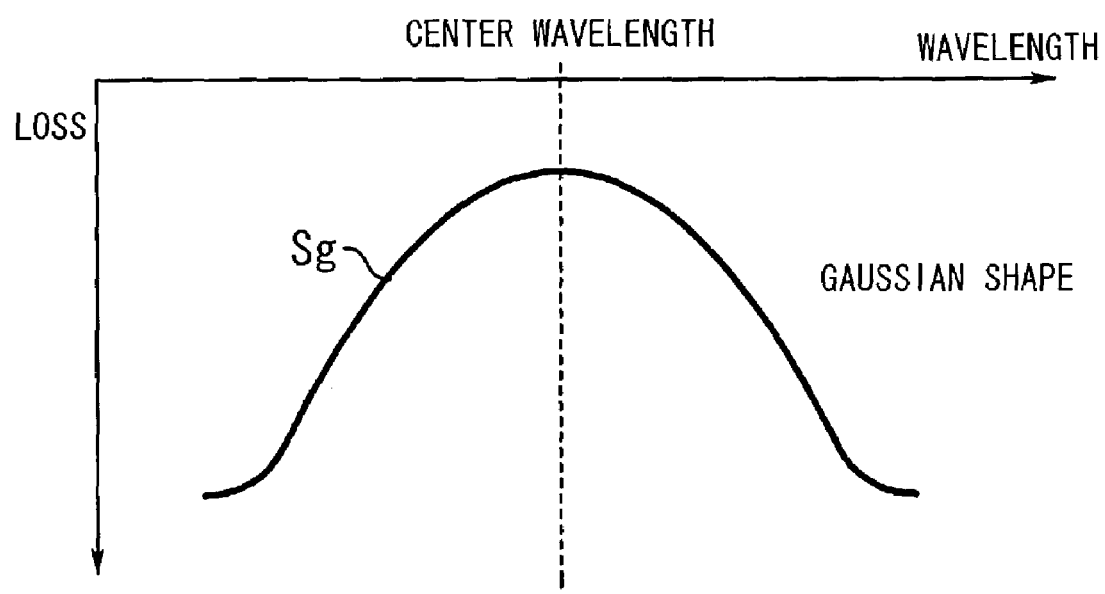
FIG. 2 illustrates the loss characteristics of a Gaussian type AWG device.

In the following, the problems to be solved by the present invention will be described in detail. As described earlier, there are two types of AWG devices: one is a Gaussian type and the other is a flat top type. FIG. 2 shows the loss characteristics of a Gaussian type AWG device. In FIG. 2, the ordinate axis indicates the loss factor, and the abscissa axis indicates the wavelength. As can be seen from FIG. 2, the optical spectrum Sg is a Gaussian spectrum that has the lowest loss factor with the center wavelength of the unit wavelength.

Figure 3:
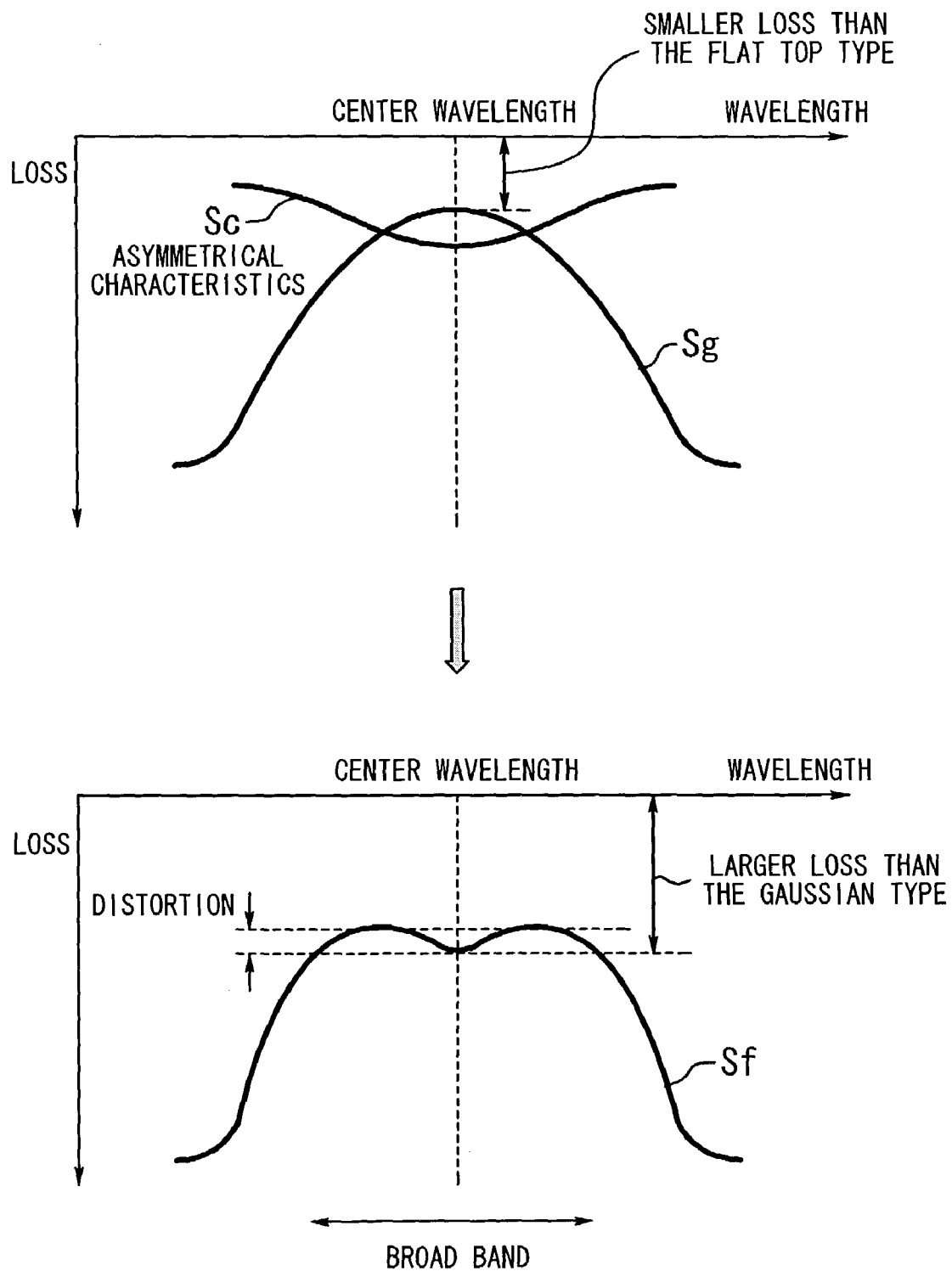
FIG. 3 illustrates the generating process of the loss characteristics of a flat top type AWG device.

FIG. 3 shows the generating process of the loss characteristics of a flat top type AWG device. In FIG. 3, the ordinate axis indicates the loss factor, and the abscissa axis indicates the wavelength. An optical filter that has an optical spectrum Sc of the opposite characteristics to the optical spectrum Sg of the Gaussian loss characteristics is provided in the Gaussian type AWG device, so that the flat top type AWG device can obtain a flat optical spectrum Sf in the vicinity of the center wavelength. However, it is still difficult to make the optical spectrum Sf completely flat, and a small distortion remains in the optical spectrum Sf.

As can be seen from the comparison between the Gaussian optical spectrum Sg and the flat-top optical spectrum Sf, the Gaussian type has an advantage having a lower loss factor than the flat top type, because the optical filter described above does not exist in the Gaussian type.

Although having a higher loss factor than the Gaussian type due to the existence of the optical filter, the flat top type has a wider band than the Gaussian type, because the optical spectrum Sf is made flat at the center wavelength.

At present, the mainstream WDM devices gather channels having a transmission rate of 2.5 Gb/s or 10 Gb/s. However, devices that are compatible with a transmission rate of 40 Gb/s have already been developed. Conventionally, the gap between the frequency of the unit wavelength used for the transmission of each channel and the frequency of the neighboring unit wavelength occupies only the area called "C band" of 1550 nm in wavelength.

To increase the capacity by a WDM device, it is necessary to gather as many optical signals of different wavelengths as possible. Therefore, the narrower the frequency gap between two neighboring unit wavelengths, the larger the number of channels that can be transmitted simultaneously. Thus, the transmission capacity is increased. Judging from this logic, the frequency gap between each two neighboring unit wavelengths should be made as narrow as possible within the wavelength area of the "C band".

However, when unit wavelengths to be multiplexed is modulated at the frequency of the transmission rate as the transmission rate becomes higher, each unit wavelength that has a sharp peak prior to the modulation becomes wider, with the peak being the axis of symmetry, and obtains a side band. As a result of the existence of the side band, each unit wavelength is enlarged in the horizontal direction, and two wavelengths overlap with each other in one area. The overlapping wavelengths interfere with each other, and therefore cause crosstalk that results in inaccurate communication.

Figure 4:
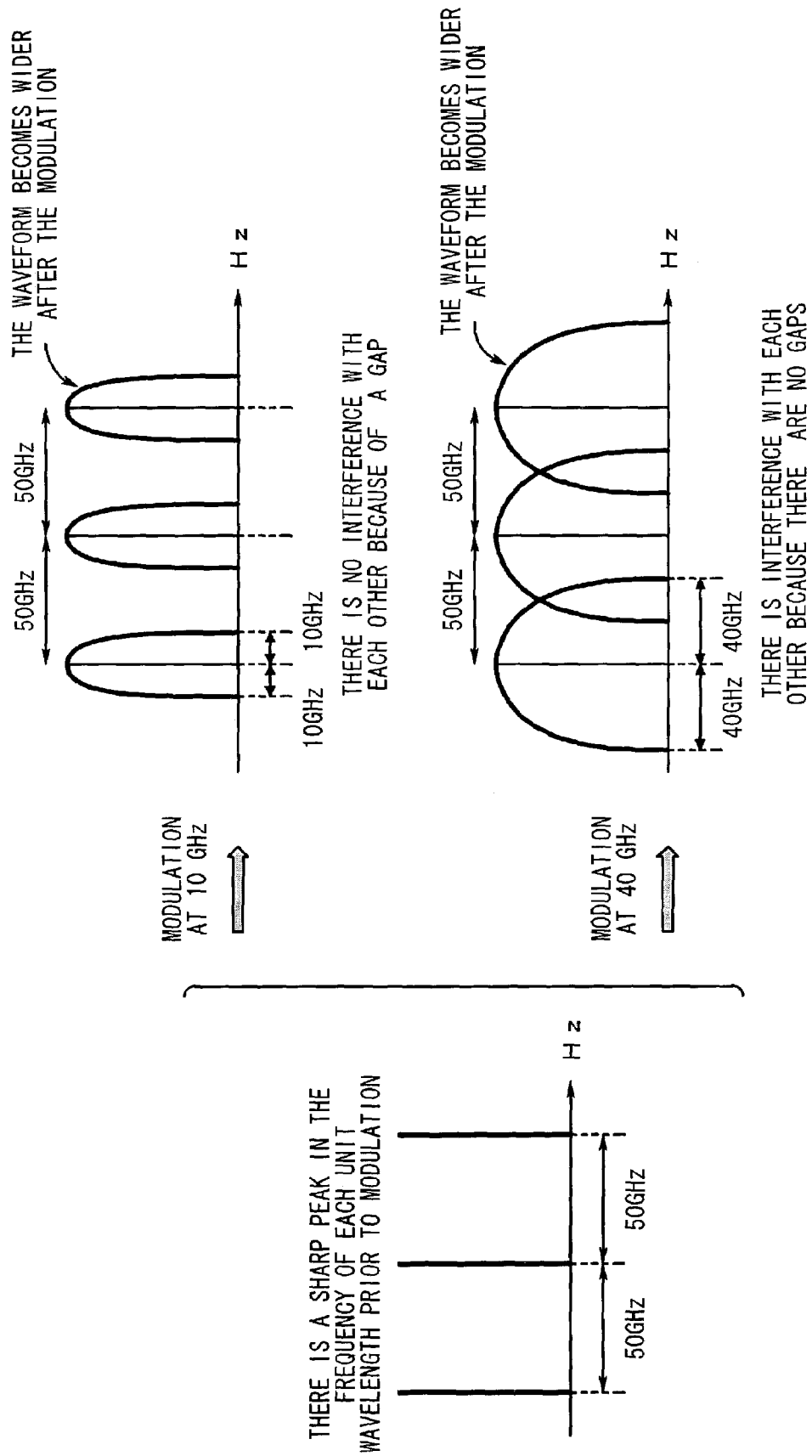
FIG. 4 illustrates the transmission rate and the limit of the frequency gap.

FIG. 4 shows the transmission rate and the limit of the frequency gap between unit wavelengths. Here, a case where the frequency gap between two neighboring unit wavelengths is a signal of 50 GHz is taken as an example.

When a signal is modulated, the waveform of the signal is widened. In a case where a signal is modulated at 10 GHz, the frequency gap between each two neighboring unit wavelengths is wide enough to prevent interference between each two neighboring unit wavelengths and to realize accurate communication. However, in a case where a signal is modulated at 40 GHz, the frequency gap is so narrow as to cause interference between neighboring unit wavelengths, resulting in inaccurate communication.

Accordingly, to increase the transmission rate and the capacity, the wavelength area to be used for multiplexing is enlarged by the current WDM technique, instead of narrowing the frequency gap between each two neighboring unit wavelengths within the wavelength area of the "C band". More specifically, a wavelength area of 1580 nm that is called "L band" is added to the "C band", and these two wavelength areas are utilized to increase the transmission capacity.

In the WDM technique that utilizes the wavelength areas of the "C band" and "L band", high-speed signals (OC (Optical Carrier)-192 (10 Gb/s) signals, for example) can be efficiently multiplexed. However, due to the modulation performed at the time of transmission, a side band is generated in the signal of each channel (the side band area also contains information), as described above.

Accordingly, in a WDM network for high-speed signals such as OC-192 signals, each node performs a combining operation and a branching operation on each signal having a side band. Thus, a flat top type AWG device that is compatible with wideband transmission is employed, so that each signal can pass through the side band area.

However, as described above, it is difficult to obtain a completely flat optical spectrum in the vicinity of the center wavelength with a flat top type AWG device, and distortions are caused in practice. Therefore, a signal that has passed through a plurality of flat top type AWG devices via a plurality of nodes contains accumulated distortions and fails to maintain flatness.

Figure 5:
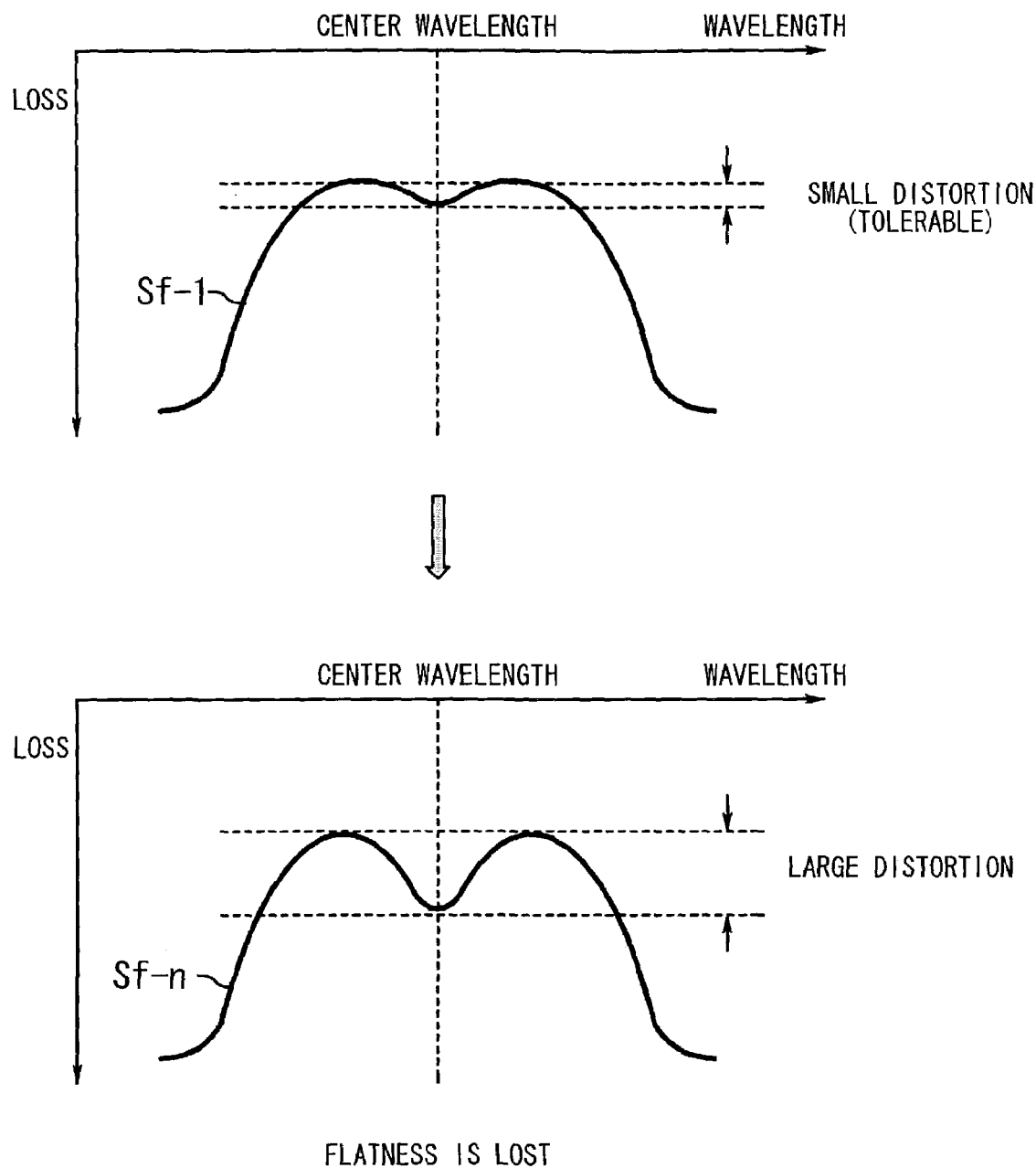
FIG. 5 illustrates an optical spectrum containing accumulated distortions.

FIG. 5 illustrates an optical spectrum in which distortions have accumulated. In FIG. 5, the ordinate axis indicates the loss factor, and the abscissa axis indicates the wavelength. An optical spectrum Sf-1 that has passed through only one flat top type AWG device exhibits a small amount of distortion. However, an optical spectrum Sf-n that has passed through a plurality of flat top type AWG devices via a plurality of nodes exhibits a large amount of distortion, and is very poor in flatness.

If the unit wavelength fails to maintain flatness in the vicinity of the center wavelength, filtering cannot be performed in the area of the side band, resulting in lower transmission quality. The present invention aims to improve the transmission characteristics so as to maintain flatness, and improve the transmission quality and reliability in a WDM network that employs flat top type AWG devices.

Figure 6:
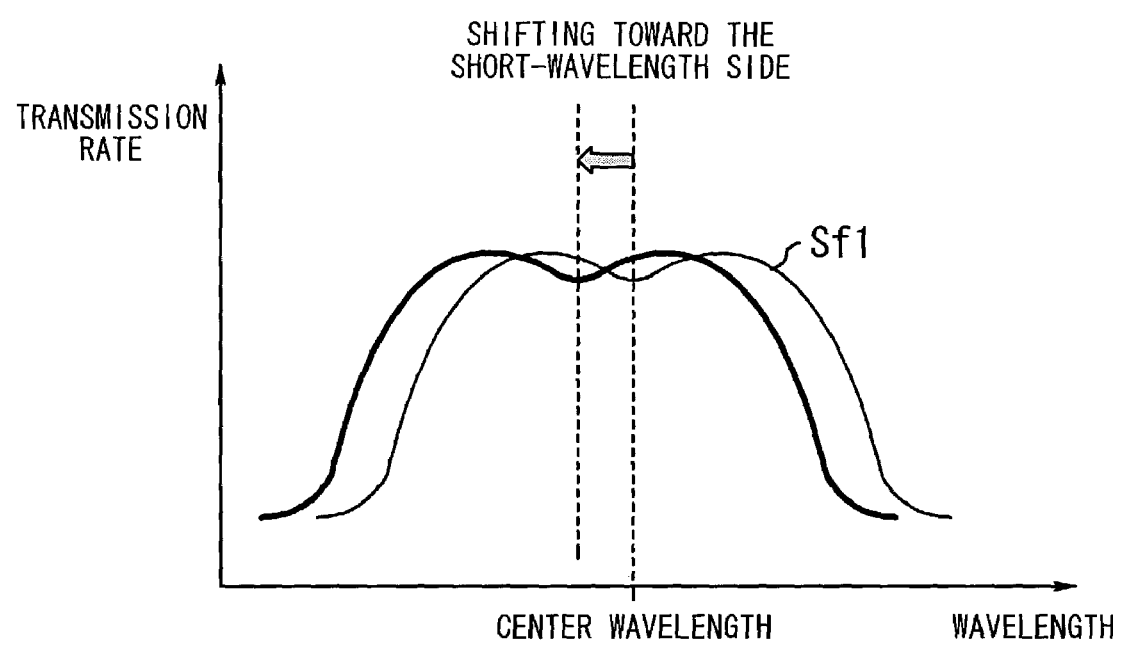
FIG. 6 illustrates a case where the transmission band is shifted in the short wavelength direction.
Figure 7:
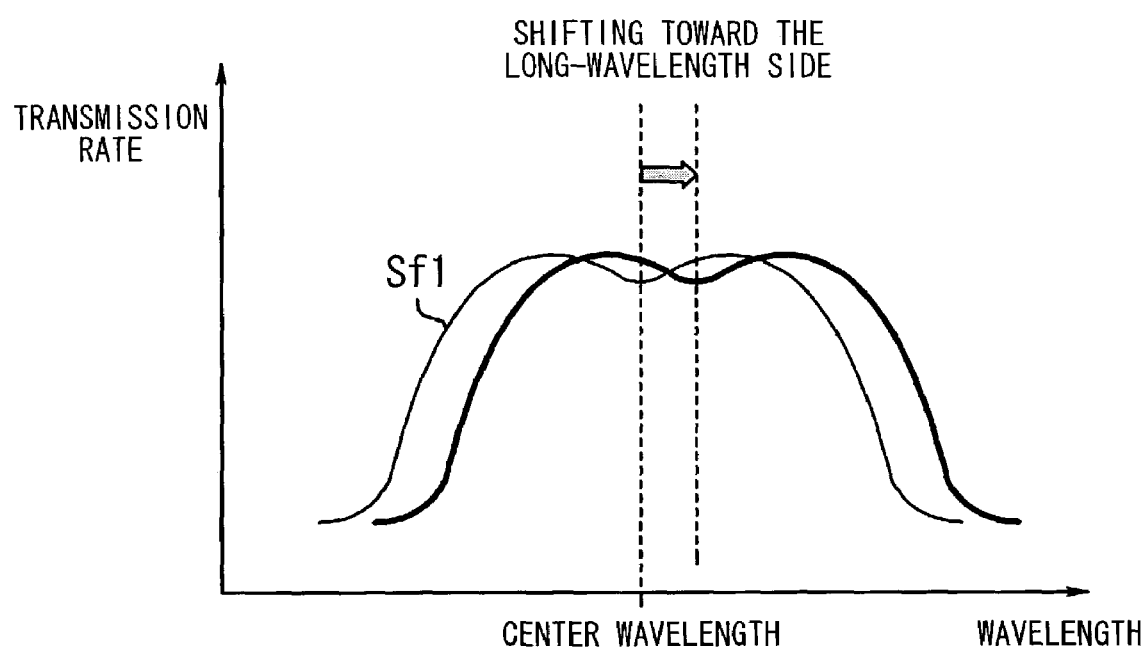
FIG. 7 illustrates a case where the transmission band is shifted in the long wavelength direction.
Figure 8:
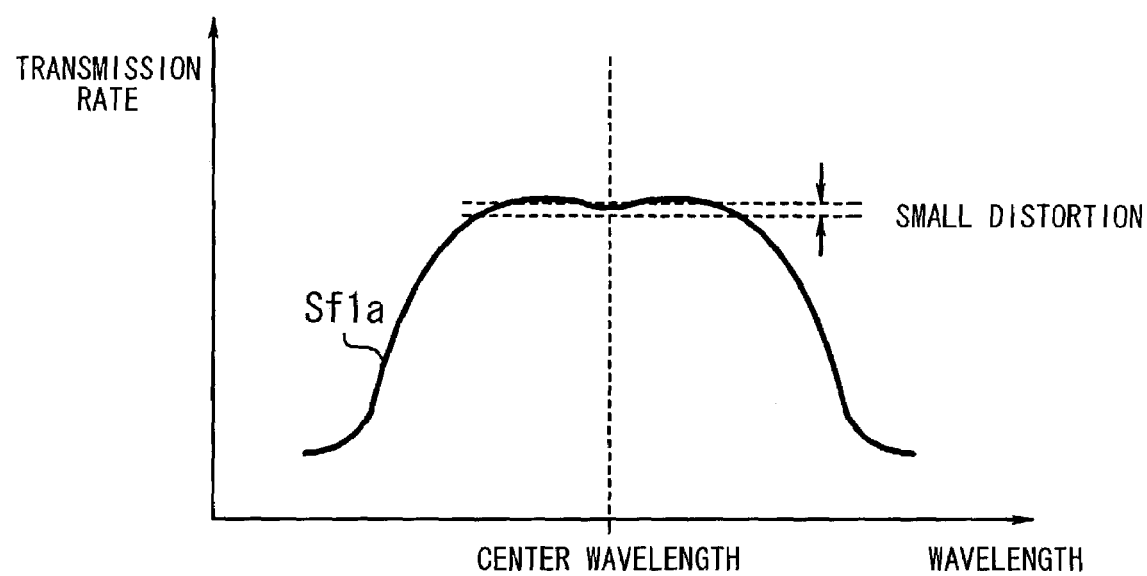
FIG. 8 illustrates a case where the transmission band is flattened.

Referring now to FIGS. 6 through 8, the transmission band being flattened by the temperature control according to the present invention will be described in detail. FIG. 6 illustrates a case where the transmission band is shifted in the short-wavelength direction, and FIG. 7 illustrates a case where the transmission band is shifted in the long-wavelength direction. FIG. 8 illustrates a case where the transmission band is flattened. In any of the figures, the ordinate axis indicates the transmission rate, the abscissa axis indicates the wavelength, the thin solid line indicates the state prior to the shifting, and the bold solid line indicates the state after the shifting.

With respect to FIG. 6, the branching filter temperature control unit 24 sets such an operation temperature that shifts the center wavelength of the optical spectrum Sf1 in the short-wavelength direction in the optical wavelength branching unit 21 of the optical reception device 20.

With respect to FIG. 7, the combining filter temperature control unit 14 sets such an operation temperature that shifts the center wavelength of the optical spectrum Sf1 in the long-wavelength direction in the optical wavelength combining unit 11 of the optical transmission device 10. By performing a temperature control operation in this manner, an optical spectrum Sf1a that has no distortions and maintains flatness at the center wavelength, as shown in FIG. 8, can be obtained at the optical wavelength branching unit 21 of the optical reception device 20.

When such an optical spectrum Sfa1 that is flat in the vicinity of the center wavelength is obtained, the amount of error correction that is gathered at the optical reception device 20 is of a small value.

Here, the flatness k of the transmission band can be expressed by the following equation (1):

$$k = dL/d\lambda$$

wherein L represents the loss, and $\lambda$ represents the wavelength.

As can be seen from the equation (1), the value k that represents the flatness is shown by the ratio of the wavelength bandwidth to the amount of loss. To achieve high-quality optical transmission, it is necessary to satisfy the predetermined value k. For instance, in a case where 10 Gb/s transmission is to be performed, the value k should be ±12 (dB/nm), and the wavelength band should be f0±0.08 nm (i.e., a width of 0.16 nm should be maintained, with f0 being the center wavelength), so that the transmission quality of a bit error rate (BER: the ratio of the number of wrongly received codes to the total number of codes) of $10^{-12}$ can be maintained.

Accordingly, in a case where 10 Gb/s transmission is to be performed according to the present invention, temperature control is performed so as to satisfy the above value k. When the transmission band is to be shifted in the short-wavelength direction or the long-wavelength direction, the transmission band should be shifted stepwise from the center wavelength, with the unit step amount being 0.01 nm, so that the amount of error correction can be minimized.

In the above description, the optical reception device 20 shifts the transmission band in the short-wavelength direction, and the optical transmission device 10 shifts the transmission band in the long-wavelength direction. However, the optical reception device 20 may shift the transmission band in the long-wavelength direction, and the optical transmission device 10 may shift the transmission band in the short-wavelength direction.

Also, the shifting direction of the transmission band (i.e., which device of the optical reception device and the optical transmission device is to shift the transmission band in the short-wavelength direction or the long-wavelength direction) and the shifting amount (i.e., the unit step amount) should be set in the branching filter temperature control unit 24 and the combining filter temperature control unit 14 in advance. Alternatively, the branching filter temperature control unit 24 and the combining filter temperature control unit 14 may communicate with each other using an OSC, so as to exchange the setting information with each other.

Figure 9:
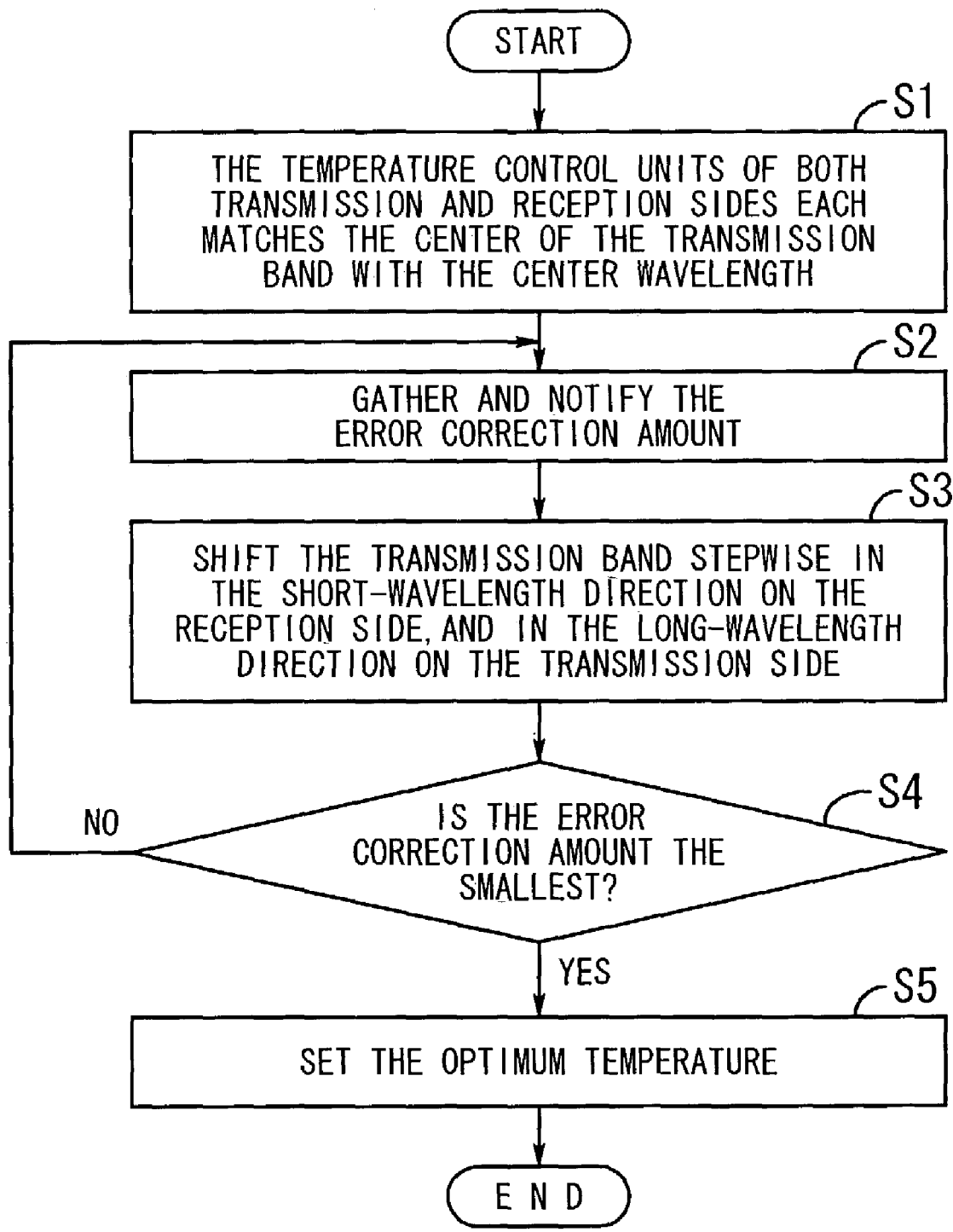
FIG. 9 is a flowchart illustrating a temperature control operation of the optical transmission system according to the present invention.

FIG. 9 is a flowchart of the temperature control operation of the optical transmission system 1 according to the present invention.

[S1] The branching filter temperature control unit 24 and the combining filter temperature control unit 14 match the center of the AWG transmission band with the center wavelength.

[S2] The error correction monitoring unit 23 gathers the error correction amounts of the optical signals of $\lambda 1$ through $\lambda n$, and notifies the branching filter temperature control unit 24 and the combining filter temperature control unit 14 of the total error correction amount.

[S3] The branching filter temperature control unit 24 shifts the transmission band stepwise by the unit in the short-wavelength direction, and the combining filter temperature control unit 14 shifts the transmission band stepwise by the unit in the long-wavelength direction.

[S4] The error correction monitoring unit 23 determines whether each error correction amount is the smallest of all. If the error correction amount is not the smallest, the operation returns to step S2. If the error correction amount is the smallest, the operation moves on to step S5.

[S5] The error correction monitoring unit 23 stores the smallest value of the error correction amounts, and notifies the branching filter temperature control unit 24 and the combining filter temperature control unit 14 that the error correction amount is the smallest at the moment. After that, the branching filter temperature control unit 24 and the combining filter temperature control unit 14 set an operation temperature based on the smallest value of the error correction amounts as the optimum value. At the time of start-up of the system, the branching filter temperature control unit 24 and the combining filter temperature control unit 14 start operations at the temperature of the optimum value. (In this flowchart, every time the stepwise shifting by the unit is performed on the reception and transmission sides, the error correction amount is gathered and notified on the reception side, and the stepwise shifting by the unit wavelength is then repeated once on the reception and transmission sides. Thus, the optimum temperature is determined.)

Figure 10:
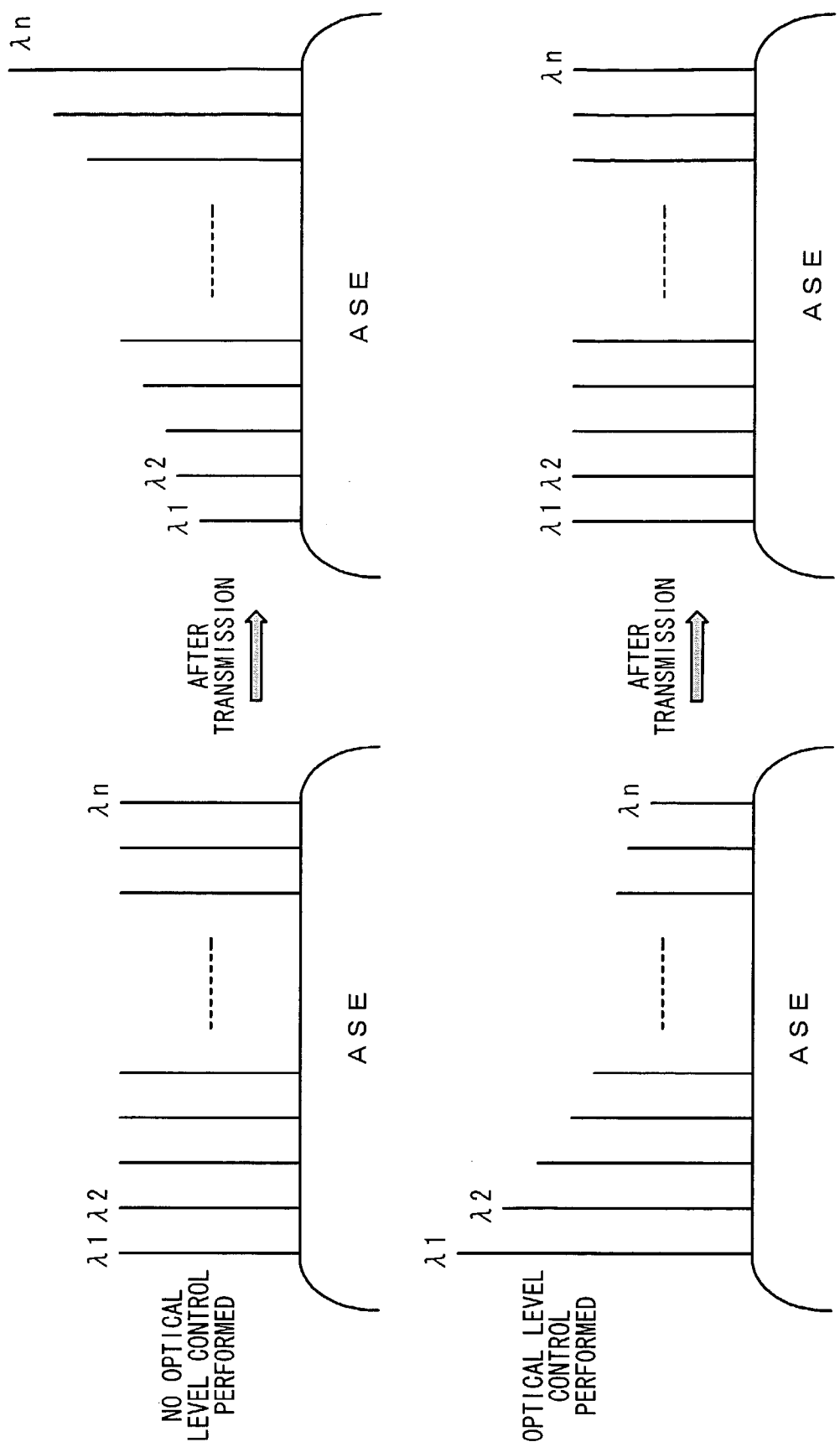
FIG. 10 illustrates the influence of the non-linear effect of a fiber-optic cable onto optical spectrums.

Next, the structures and operations of the optical level measuring unit 25 and the optical level control unit 15 will be described. FIG. 10 illustrates the influence from the non-linear effect of the optical fiber onto an optical spectrum. The optical signal of each wavelength is made up of ASE (Amplified Spontaneous Emission) noise and a signal optical component.

When a WDM wavelength-multiplexed signal is transmitted through a fiber-optic cable, the short-wavelength side of the wavelength-multiplexed signal is attenuated due to the non-linear effect (Raman effect) of the optical fiber, and an increasing tilt is caused at the long-wavelength side of the wavelength-multiplexed signal.

To secure a predetermined OSNR (Optical Signal Noise Ratio: the S/N of the optical region) on the reception side, the optical variable attenuators 16-1 through 16-n adjust the optical power to attain a tilt of the opposite characteristics in advance on the transmission side, so that the signal optical level can be fixed on the reception side.

Meanwhile, as described with reference to FIG. 3, an optical filter of the opposite characteristics from the characteristics of a Gaussian type is provided in a flat top type AWG device. Accordingly, the optical loss of either of the optical wavelength combining unit 11 and the optical wavelength branching unit 21 is greater than the optical loss of a Gaussian type AWG device.

To compensate the loss in the optical level, the optical level measuring unit 25 is provided in the optical reception device 20, and the optical level control unit 15 is provided in the optical transmission device 10 in accordance with the present invention. The optical level measuring unit 25 measures the optical level of each optical signal, and generates optical level information. The optical level measuring unit 25 then transmits the optical level information to the optical level control unit 15 through the OSC. Based on the optical level information, the optical level control unit 15 adjusts and sets the attenuation of each of the optical variable attenuators 16-1 through 16-n. Thus, the optical level change due to the non-linear effect of the optical fiber and the optical level loss of the flat top type AWG devices (i.e., the optical wavelength combining unit 11 and the optical wavelength branching unit 21) are both compensated.

Figure 11:
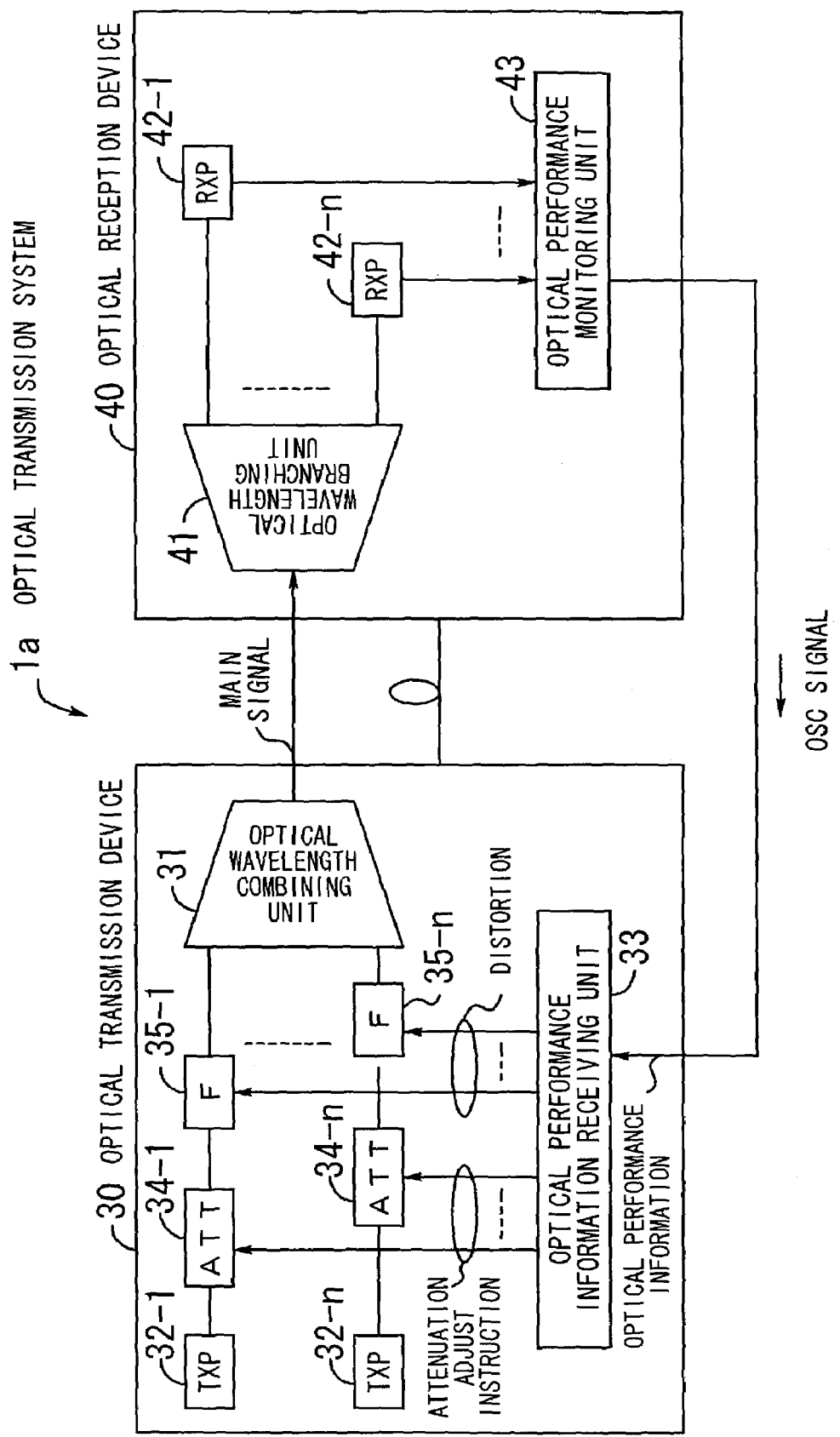
FIG. 11 illustrates the structure of the optical transmission system according to the present invention.

In the following, an optical transmission system in which an operation is performed to flatten the transmission characteristics at a fixed temperature but does not shift the transmission band will be described. FIG. 11 illustrates the structure of such an optical transmission system. The optical transmission system 1a includes an optical transmission device 30 and an optical reception device 40, and performs WDM optical transmission.

The functions of the optical transmission 30 and the optical reception device 40 of the present invention are incorporated into a single device (a node) in practice, and these devices are connected to each other with a fiber-optic cable that is the mating line of the self line.

The optical reception device 40 includes an optical wavelength branching unit 41. The optical wavelength branching unit 41 has a flat top type AWG device serving as a branching filter for the optical reception device 40, and performs a branching operation on each wavelength-multiplexed optical signal. The temperature control operation described in relation to the system shown in FIG. 1 is not performed in this embodiment, and the operation temperature is fixed. The shifting of the transmission band is not performed either.

Reception transponders 42-1 through 42-n receive optical signals that have been subjected to the branching operation by the wavelength at the optical wavelength branching unit 41. An optical performance monitoring unit 43 has an optical spectrum analyzing function that measures the bit error rate (BER) and the optical level of each optical signal received through the reception transponders 42-1 through 42-n. The optical performance monitoring unit 43 then generates optical performance information including the measurement results, and transmits it to the optical transmission device 30 through an OSC.

The optical transmission device 30 includes an optical wavelength combining unit 31. The optical wavelength combining unit 31 has a flat top type AWG device functioning as a combining filter, and performs a combining operation on optical signals to output a wavelength-multiplexed optical signal. The temperature control operation described in relation to the system shown in FIG. 1 is not performed, and the operation temperature is fixed. The shifting of the transmission band is not performed either.

Optical variable attenuators 34-1 through 34-n control the attenuation of the optical level of each optical signal transmitted from transmission transponders 32-1 through 32-n, in accordance with an attenuation adjust instruction sent from an optical performance information receiving unit 33.

Correction filters 35-1 through 35-n perform correction on attenuation-controlled optical signals, based on distortion information supplied from the optical performance information receiving unit 33. More specifically, the correction filters 35-1 through 35-n perform filtering of the opposite characteristics that cancel the distortions caused at the optical wavelength combining unit 31 and the optical wavelength branching unit 41. The correction filters 35-1 through 35-n hold a reference table of the distortion information and characteristics data in advance.

The optical performance information receiving unit 33 receives the optical performance information from the optical reception device 40, and generates the attenuation adjust instruction from the optical level measurement results. The optical performance information receiving unit 33 also generates the distortion information from the bit error rate (holding a reference table of the bit error rate and the distortion information), and outputs the distortion information to an optical variable attenuator or a correction filter that is to perform a control operation.

Figure 12:
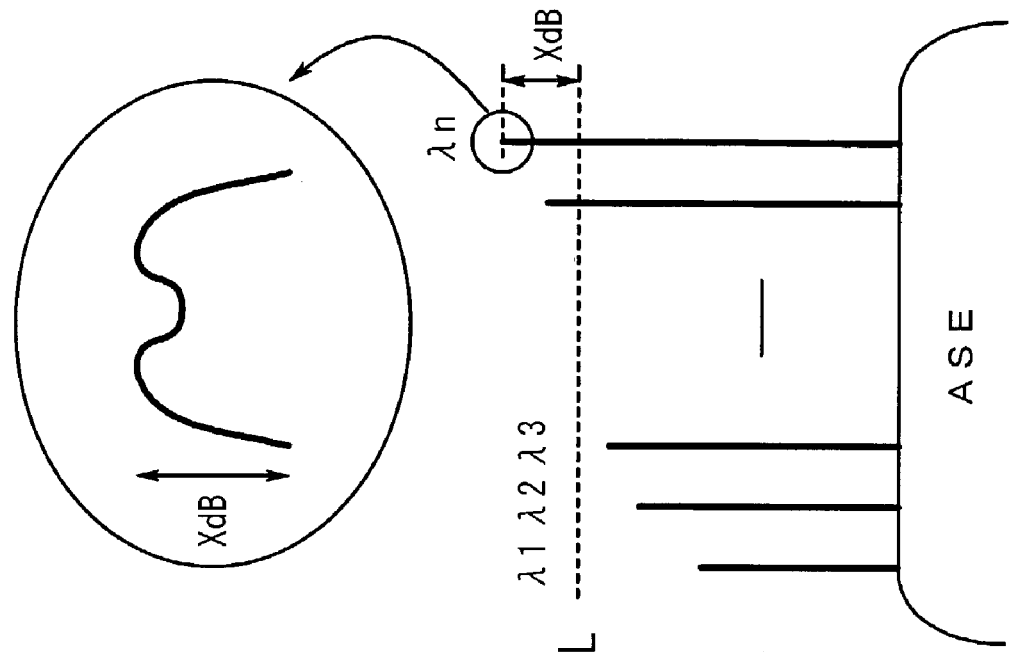
FIG. 12 is a schematic view illustrating an operation of the optical transmission system according to the present invention.
Figure 12:
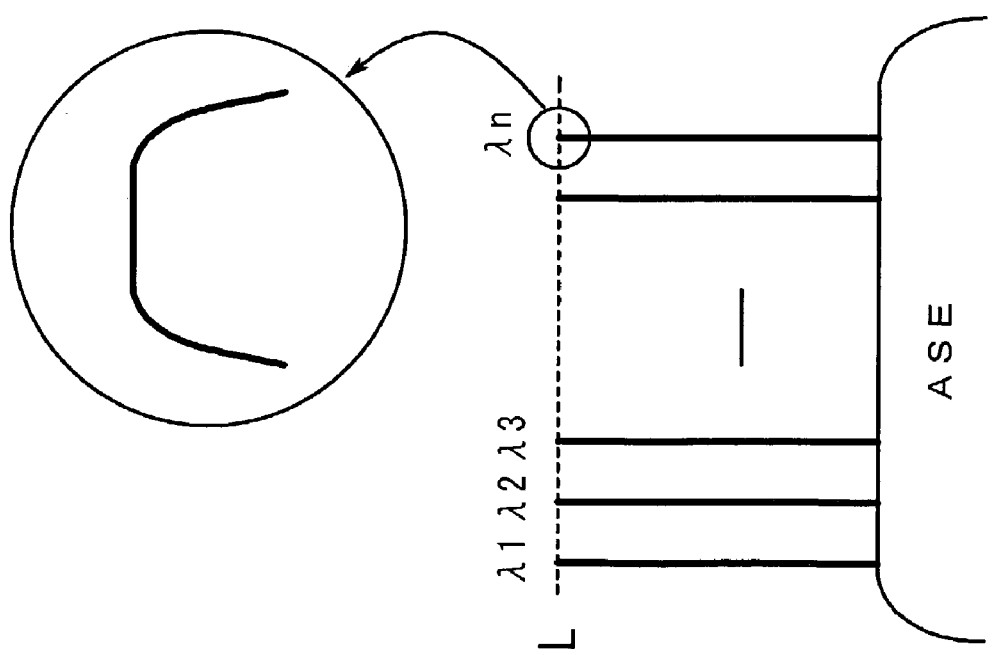
Figure 13:
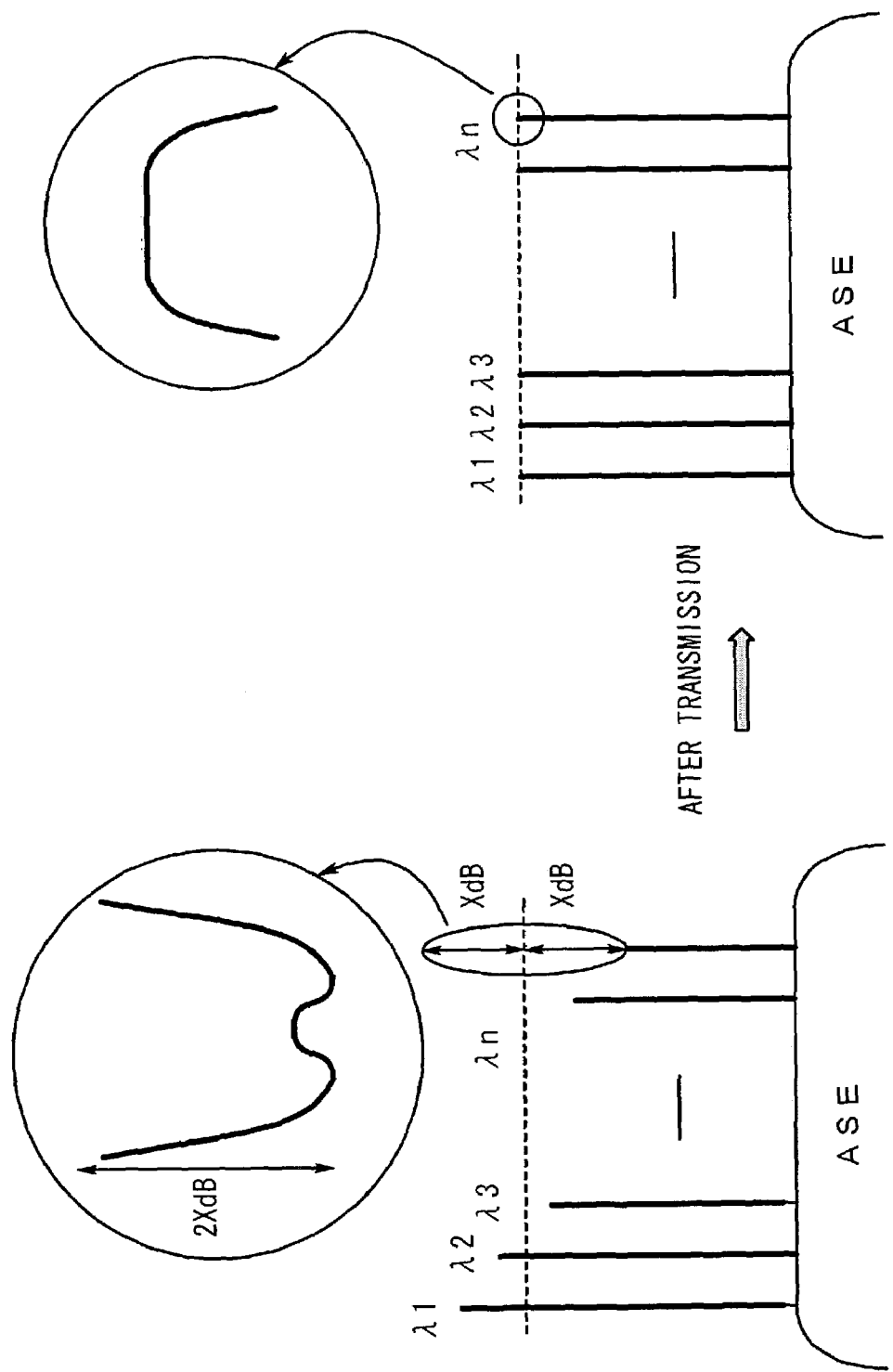
FIG. 13 is another schematic view illustrating an operation of the optical transmission system according to the present invention.

The operation of the optical transmission system 1a will now be described. FIGS. 12 and 13 illustrate the operation of the optical transmission system 1a. FIG. 12 illustrates a case where an optical level control operation and a flatness increasing operation are not performed. Each of the optical signals corresponding of the wavelengths λ1 through λn is made up of ASE noise and a signal optical component. When a wavelength-multiplexed signal is transmitted, the short-wavelength side is attenuated, and an increasing non-linear effect of the optical fiber is caused at the long-wavelength side. As a result, the transmitted signal has a tile that rises on the right side. The transmission characteristics of each wavelength are flat prior to the transmission. However, after the signal corresponding to each wavelength passes through a plurality of flat top type AWG devices, distortions have accumulated in the vicinity of the center wavelength, and the flatness is lost. In the case shown in FIG. 12, the wavelength λn increases from the starting level L by XdB, and loses flatness.

FIG. 13 illustrates a case where an optical level control operation and a flatness increasing operation are performed in the optical transmission system 1a according to the present invention. In the optical level control operation, the optical variable attenuators 34-1 through 34-n are provided on the transmission side to adjust the optical power, so that a predetermined OSMR can be secured on the reception side. By doing so, a tilt of the opposite characteristics is obtained so as to maintain the signal optical level at a fixed level on the reception side.

In the flatness increasing operation, the correction filters 35-1 through 35-n perform filtering of the opposite characteristics, so that the distortions caused at the optical wavelength combining unit 31 and the optical wavelength branching unit 41 can be cancelled.

With respect to the wavelength λn in the case shown in FIG. 13, the optical variable attenuator 34-n to control the optical level of the optical signal (λn) attenuates the level of the optical signal (λn) from the level L by XdB in advance.

The correction filter 35-n to correct the distortion of the optical signal (λn) performs filtering of the opposite characteristics shown in FIG. 13, so that the distortions caused at the optical wavelength combining unit 31 and the optical wavelength branching unit 41 can be cancelled. By performing such a control operation on the side of the optical transmission device 30, the optical level is maintained at the fixed level L, and the flatness of the transmission characteristics can be maintained on the side of the optical reception device 40.

Figure 14:
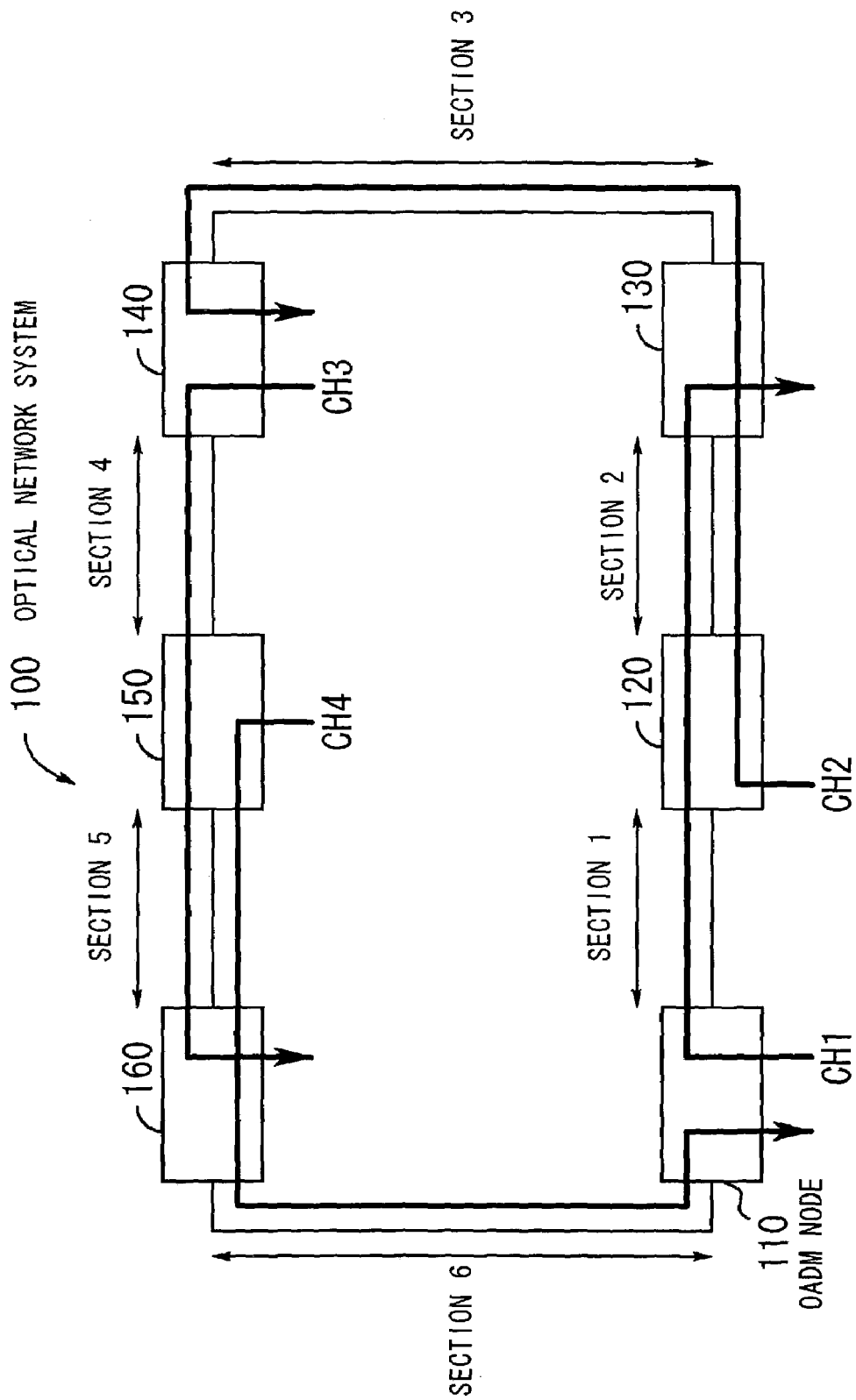
FIG. 14 illustrates the entire structure of an optical network system according to the present invention.
Figure 15:
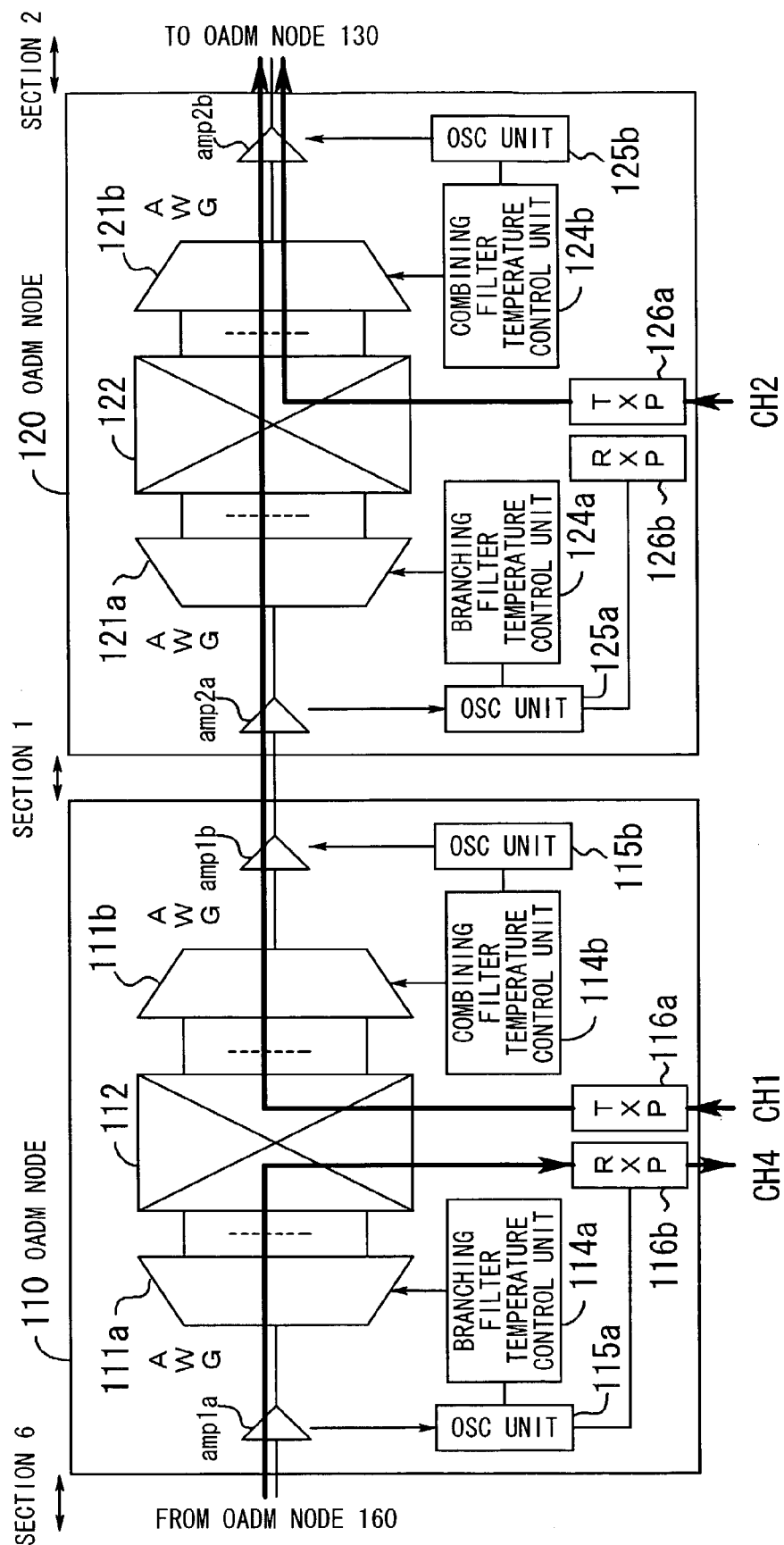
FIG. 15 illustrates the structures of the OADM nodes in the optical network system shown in FIG. 14.
Figure 16:
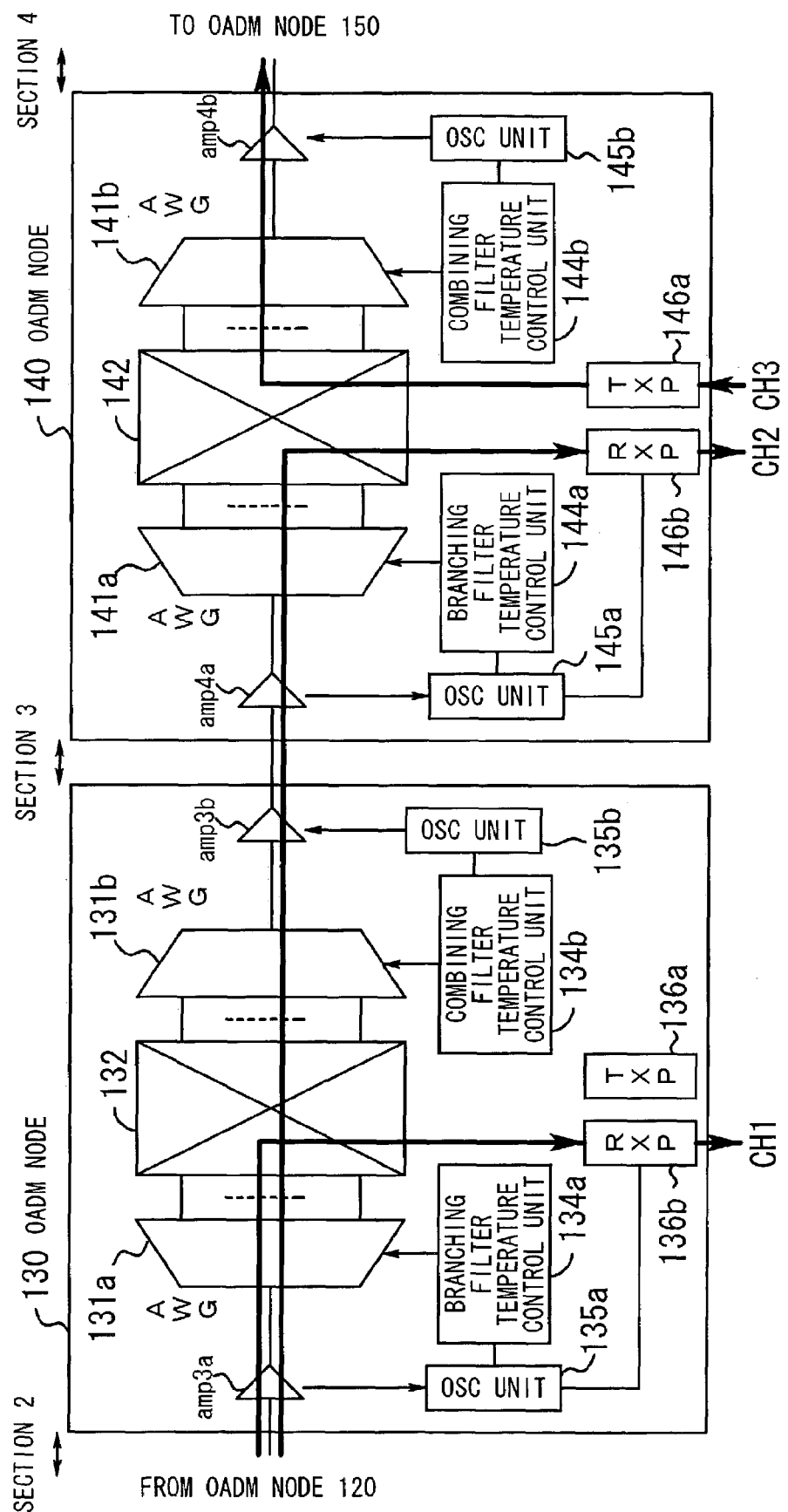
FIG. 16 illustrates the structures of the OADM nodes in the optical network system shown in FIG. 14.

Referring now to FIGS. 14 through 16, a case where the functions of the optical transmission system 1 shown in FIG. 1 are applied to an optical ring network in which all the nodes are OADM nodes will be described.

FIG. 14 illustrates the entire structure of the optical network system. The optical network system 100 is a ring network in which OADM nodes 110 through 160 containing the functions of the present invention are connected with a fiber-optic cable. In FIG. 14, the connection sections of the OADM nodes 110 through 160 are referred to as sections 1 through 5, and the optical channel flow within the ring is indicated by a bold solid line.

An optical channel CH1 "Adds" from the tributary of the OADM node 110, and "Drops" to the tributary of the OADM node 130 via the OADM node 120. An optical channel CH2 "Adds" from the tributary of the OADM node 120, and "Drops" to the tributary of the OADM node 140 via the OADM node 130.

An optical channel CH3 "Adds" from the tributary of the OADM node 140, and "Drops" to the tributary of the OADM node 160 via the OADM node 150. An optical channel CH4 "Adds" from the tributary of the OADM node 150, and "Drops" to the tributary of the OADM node 110 via the OADM node 160.

FIGS. 15 and 16 illustrate the structures of the OADM nodes of the optical network system 100. The OADM node 110 includes an AWG device 111a (equivalent to the optical wavelength branching unit 21), an AWG device 111b (equivalent to the optical wavelength combining unit 11), an OXC (Optical Cross-Connect) switch 112, a branching filter temperature control unit 114a, a combining filter temperature control unit 114b, OSC units 115a and 115b (including the functions of the error correction monitoring unit 23 and the optical level measuring unit 25, and communicable with each other within one node), a TXP 116a, a RXP 116b, and optical amplifiers amp 1a and amp 1b for optical main signals. Each of the remaining OADM nodes 120, 130, and 140 has the same structure, and therefore explanation for them is omitted herein.

In the following, an optical channel path process according to the present invention will be described.

[S10] With respect to the optical channel CH1, the error correction amount information is sent to the branching filter temperature control unit 124a and the combining filter temperature control unit 114b via the OSC unit 135a, the OSC unit 125b, the OSC unit 125a, and the OSC unit 115b in this order.

[S11] The combining filter temperature control unit 114b and the branching filter temperature control unit 124a perform a feedback AWG temperature control operation for the section 1. This temperature control operation is to perform wavelength shifting at the AWG devices 111b and AWG 121a, and perform a flattening operation at the center wavelength.

[S12] The OSC unit 115b notifies the OADM node 120 via the OSC unit 115b and the OSC unit 125a in this order that the feedback AWG temperature control operation of step S11 has been completed.

[S13] With respect to the optical channel CH1, the error correction amount information is sent to the combining filter temperature control unit 124b via the OSC unit 135a and the OSC unit 125b in this order.

[S14] The combining filter temperature control unit 124b and the branching filter temperature control unit 134a perform a feedback AWG temperature control operation for the section 2. In this temperature control operation, wavelength shifting is performed at the AWG devices 121b and 131a, so as to perform a flattening operation at the center wavelength.

[S15] The OSC unit 135b notifies the OADM node 140 via the OSC unit 135b and the OSC unit 145a in this order that the feedback AWG temperature control operation of step S14 has been completed.

[S16] With respect to the optical channel CH2, the error correction amount information is sent to the combining filter temperature control unit 134b via the OSC unit 145a and the OSC unit 135b in this order.

[S17] The combining filter temperature control unit 134b and the branching filter temperature control unit 144a perform a feedback AWG temperature control operation for the section 3. In this temperature control operation, wavelength shifting is performed at the AWG devices 131b and 141a, thereby performing a flattening operation at the center wavelength. As for the sections 4 through 6, the same procedures as above are repeated.

Figure 17:
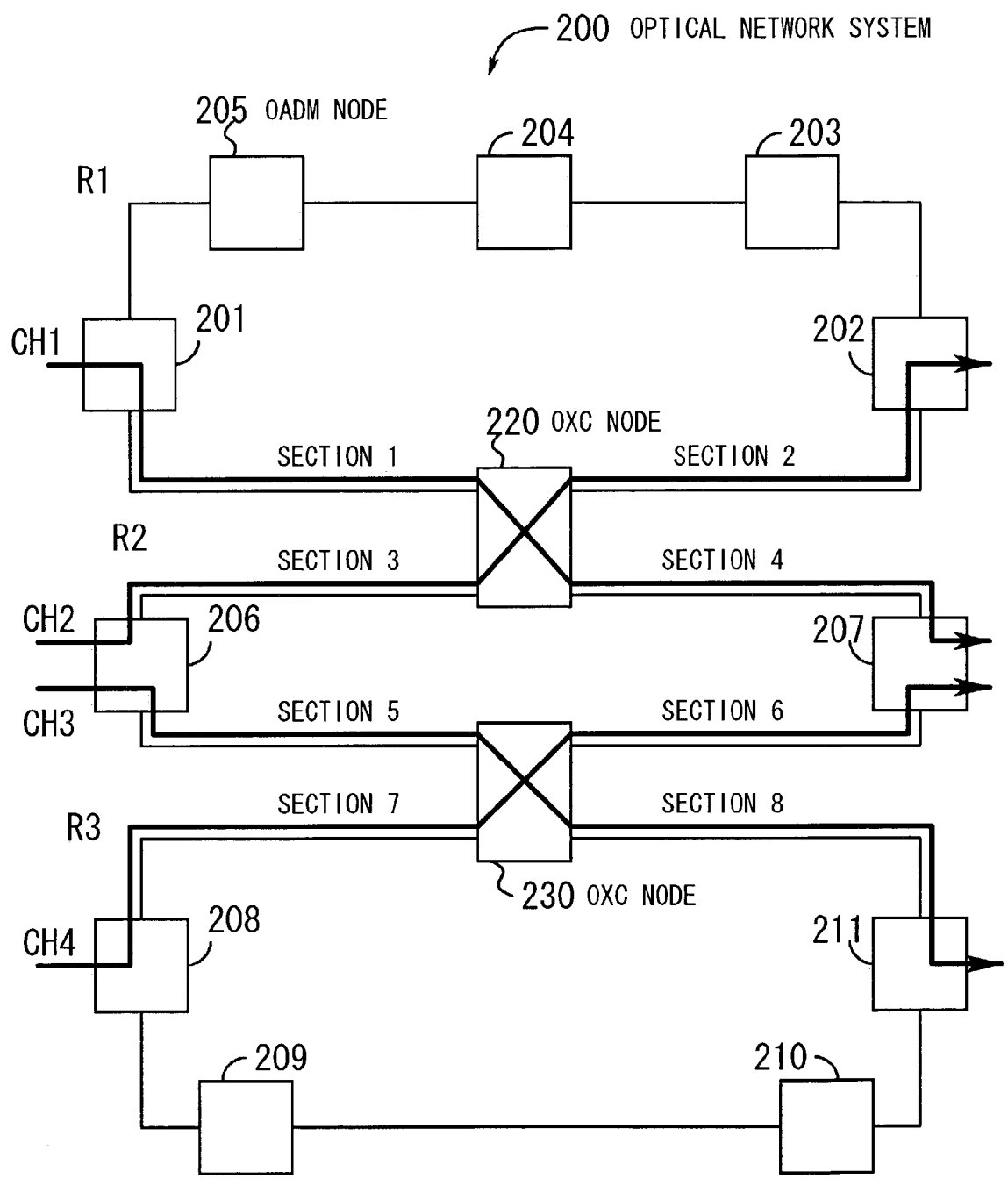
FIG. 17 illustrates the entire structure of an optical network system according to the present invention.
Figure 18:
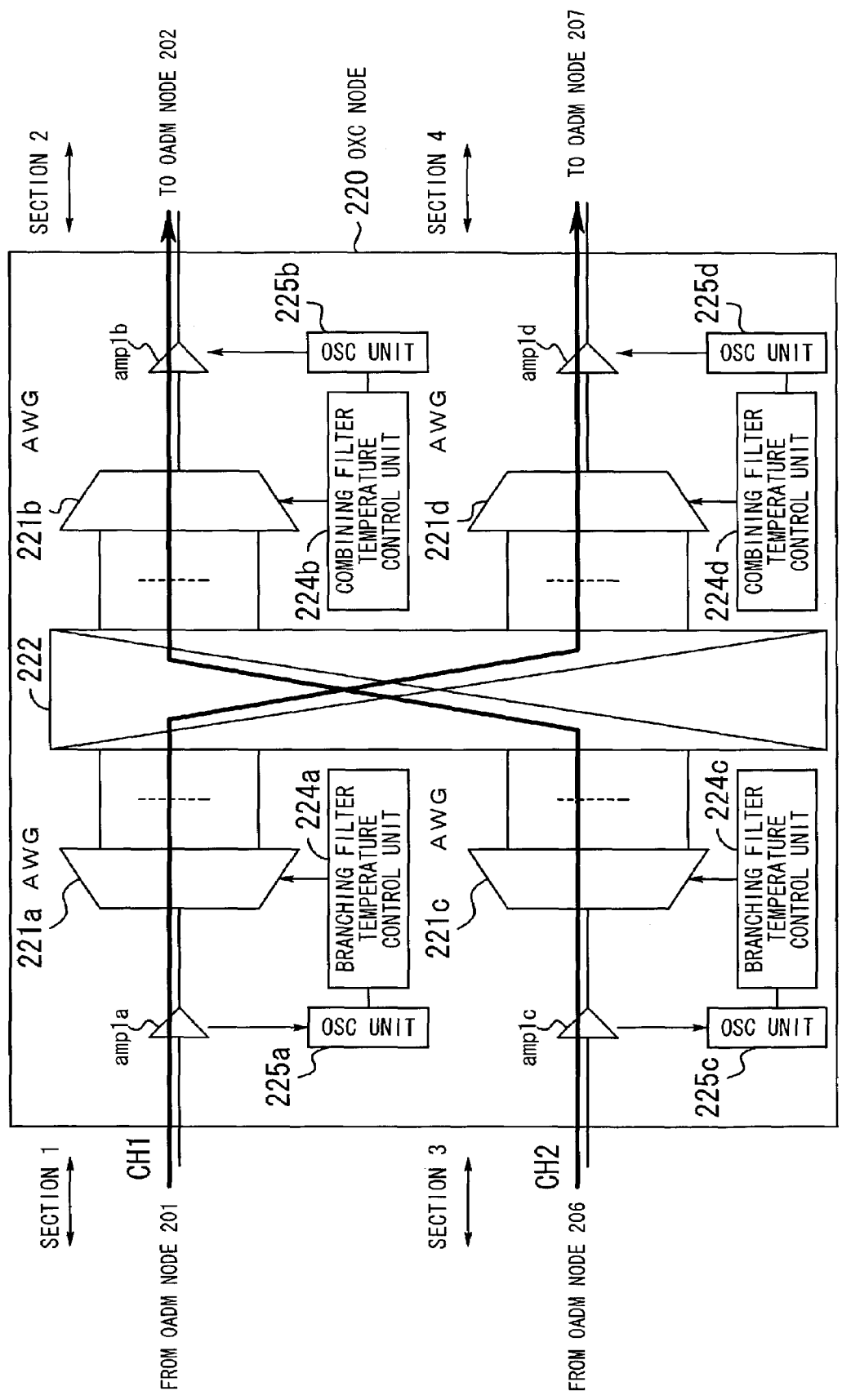
FIG. 18 illustrates the structure of an OXC node in the optical network system shown in FIG. 17.
Figure 19:
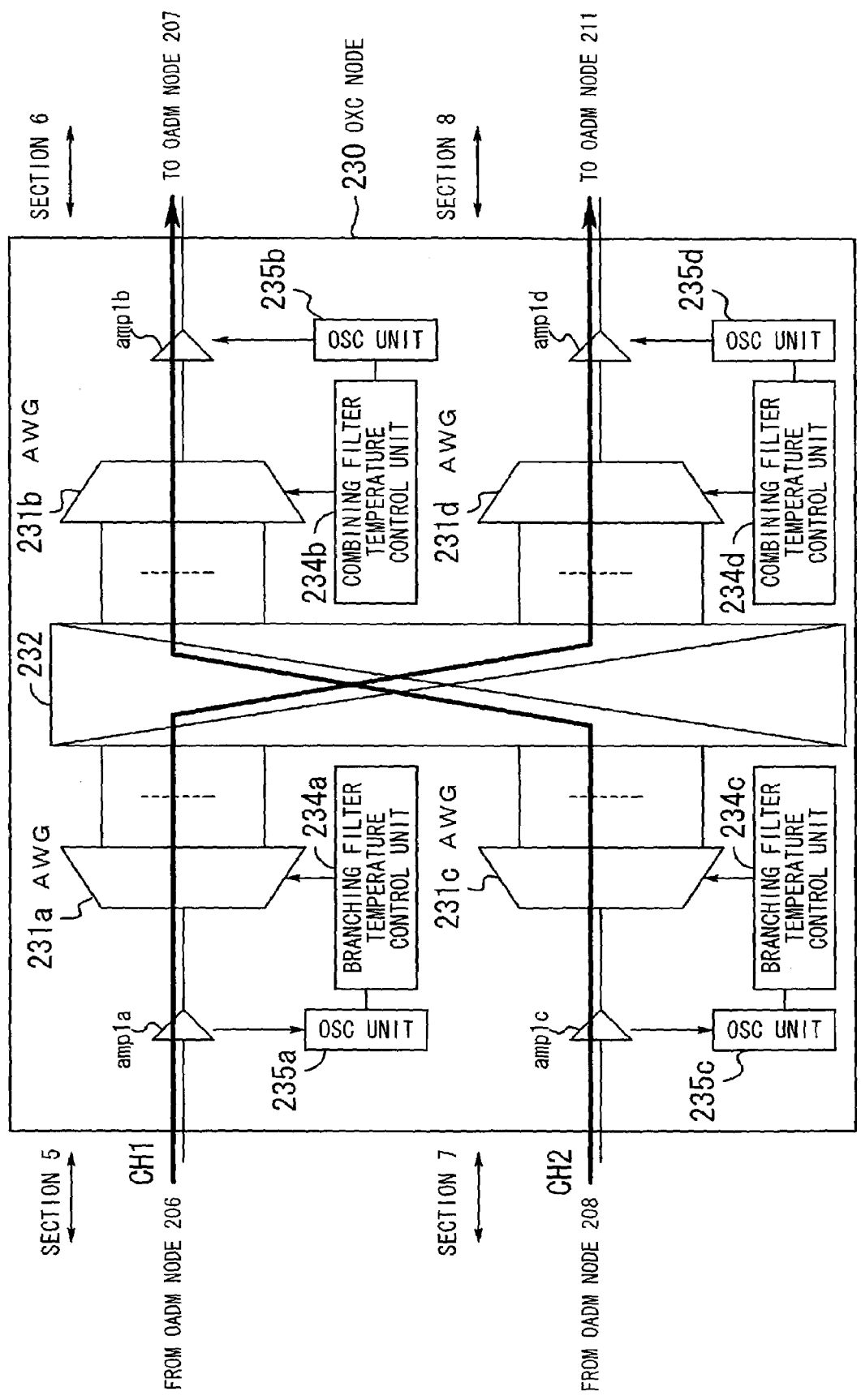
FIG. 19 illustrates the structure of an OXC node in the optical network system shown in FIG. 17.
Figure 20:
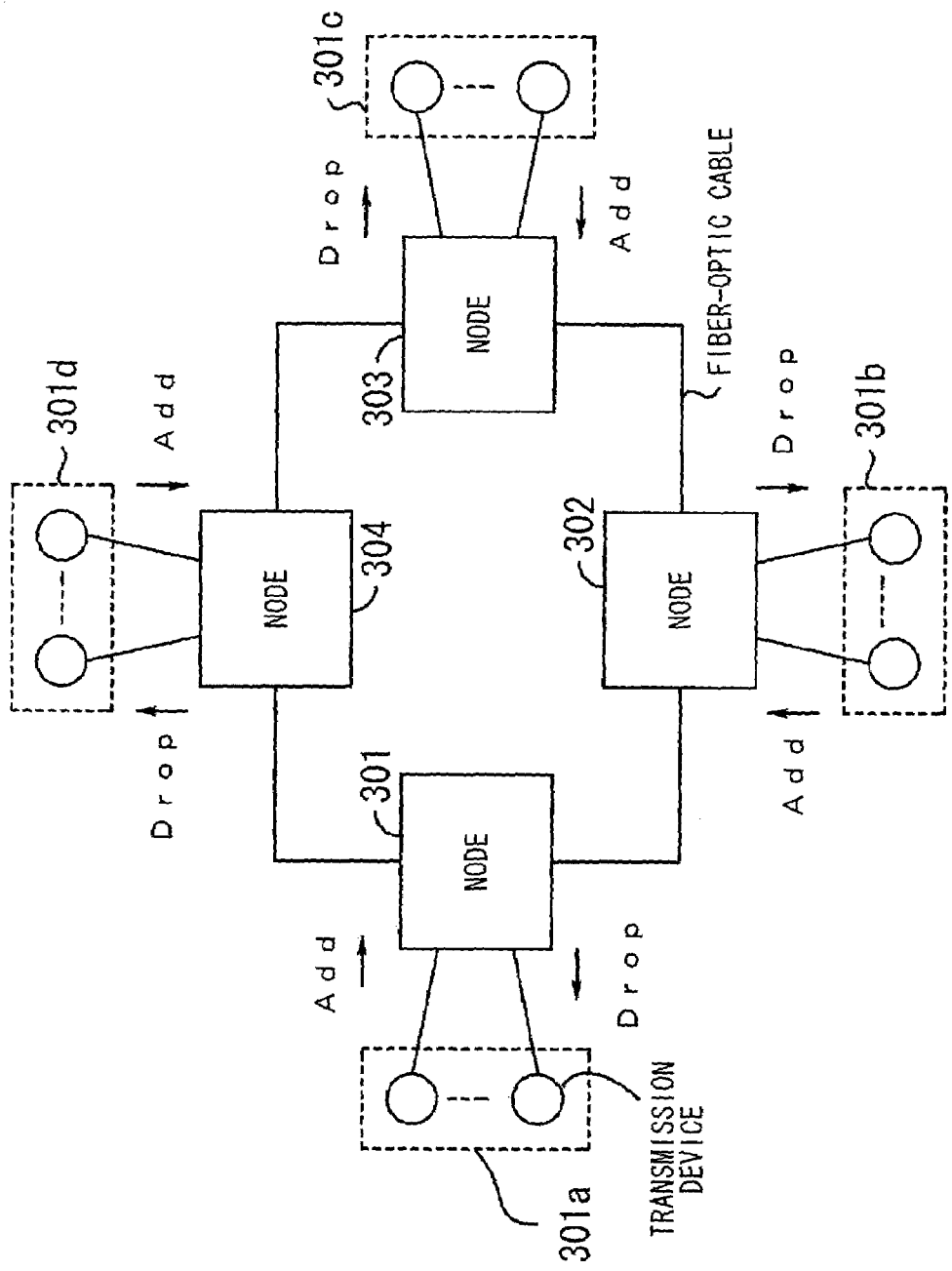
FIG. 20 illustrates the structure of a conventional WDM ring network.
Figure 21:
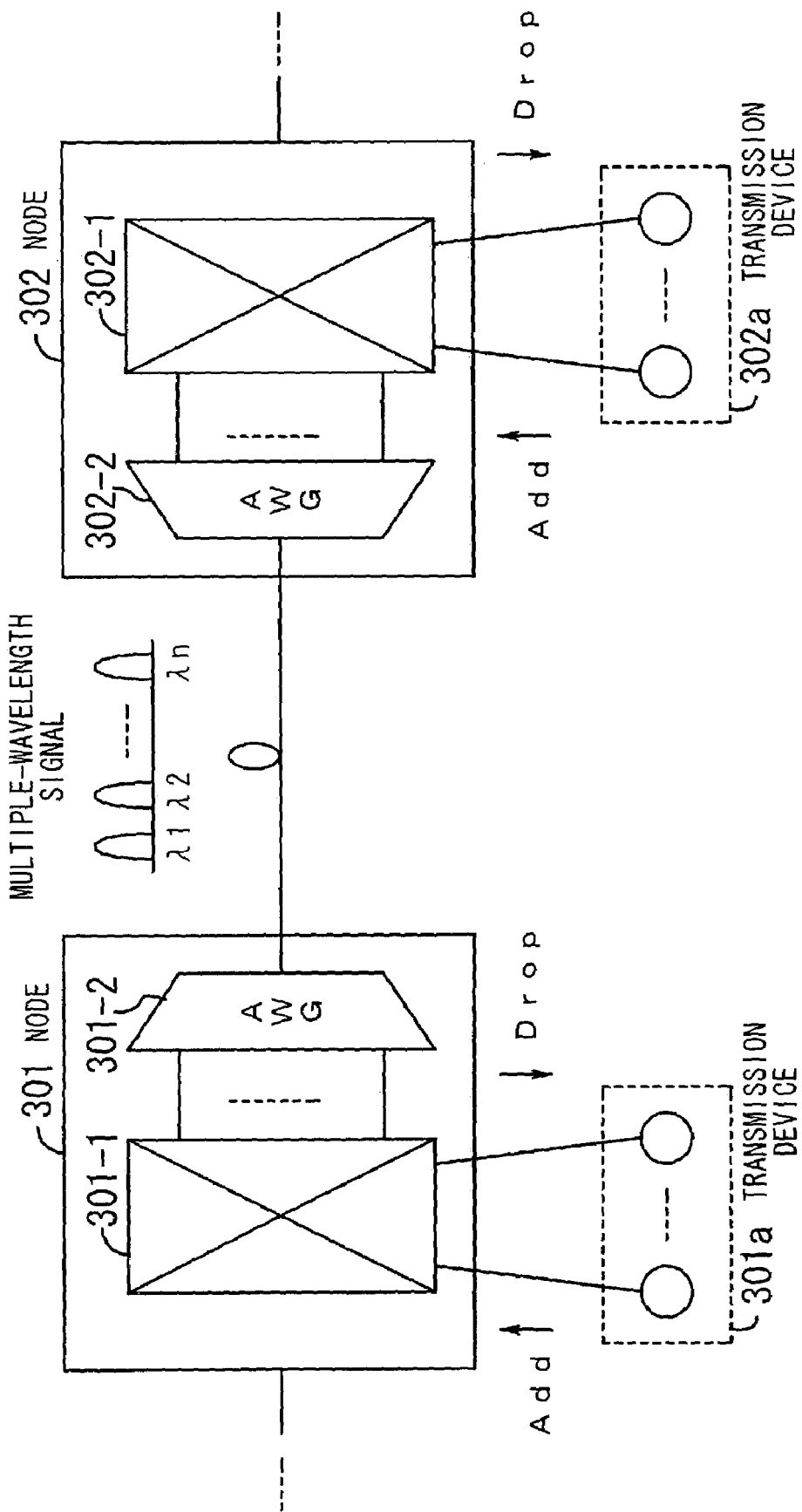
FIG. 21 is a schematic view illustrating the structures of conventional OADM nodes.

Referring now to FIGS. 17 through 19, a case where the functions of the optical transmission system 1 shown in FIG. 1 are applied to an optical ring network including OADM nodes and OXC nodes (that have no OADM functions and perform optical cross-connect process) will be described below. FIG. 17 illustrates the entire structure of such an optical network system. The optical network system 200 is a ring network in which OADM nodes 201 through 211 and OXC nodes 220 and 230 containing the functions of the present invention are connected with a fiber-optic cable.

In this connection structure, a ring R1 that includes the OADM nodes 201 through 205 is connected to a ring R2 that includes the OADM nodes 206 and 207 via the OXC node 220. Also, a ring R3 that includes the OADM nodes 208 through 211 is connected to the ring R2 via the OXC node 230.

In FIG. 17, the connection sections among the OADM nodes 201 and 202 and the OXC node 220 are referred to as sections 1 and 2. Likewise, the connection sections among the OADM nodes 206 and 207 and the OXC node 220 are referred to as sections 3 and 4. The connections sections among the OADM nodes 206 and 207 and the OXC node 230 are referred to as sections 5 and 6. The connection sections among the OADM nodes 208 and 211 and the OXC node 230 are referred to as sections 7 and 8. The optical channel flow within each ring is indicated by a bold solid line in FIG. 17.

The optical channel CH1 "Adds" from the tributary of the OADM node 201, and "Drops" to the tributary of the OADM node 207 via the OXC node 220. The optical channel CH2 "Adds" from the tributary of the OADM node 206, and "Drops" to the tributary of the OADM node 202 via the OXC node 220.

The optical channel CH3 "Adds" from the tributary of the OADM node 206, and "Drops" to the tributary of the OADM node 211 via the OXC node 230. The optical channel CH4 "Adds" from the tributary of the OADM node 208, and "Drops" to the tributary of the OADM node 207 via the OXC node 230.

FIGS. 18 and 19 illustrate the structures of the OXC nodes. It should be noted that the OADM nodes in the optical network system 200 have the same structures as the structures shown in FIGS. 15 and 16.

The OXC node 220 includes AWG devices 221a and 221c (equivalent to the optical wavelength branching unit 21), AWG devices 221b and 221d (equivalent to the optical wavelength combining unit 11), an OXC (Optical Cross-Connect) switch 222, branching filter temperature control units 224a and 224c, combining filter temperature control units 224b and 224d, OSC units 225a through 225d (including the functions of the error correction monitoring unit 23 and the optical level measuring unit 25, and communicable with each other within one node), and optical amplifiers amp 1a through amp1d for optical main signals. The OXC node 230 has the same structure as the OXC node 220, and therefore explanation for it is omitted herein.

In the following, an optical channel path process according to the present invention will be described.

[S20] With respect to the optical channel CH1, the error correction amount information is sent to the combining filter temperature control unit 224d, the branching filter temperature control unit 224a, and the combining filter temperature control unit in the OADM node 201, via the OSC unit in the OADM node 207, the OSC unit 225*d*, the OSC unit 225*a*, and the OSC unit in the OADM node 201 in this order.

[S21] The combining filter temperature control unit of the OADM node 201 and the branching filter temperature control unit 224*a* of the OXC node 220 perform a feedback AWG temperature control operation for the section 1. In this temperature control operation, wavelength shifting is carried out at the AWG device of the OADM node 201 and the AWG device 221*a* of the OXC node 220, so that a flattening operation is performed at the center wavelength.

[S22] The combining filter temperature control unit 224*d* and the branching filter temperature control unit of the OADM node 207 perform a feedback AWG temperature control operation for the section 4. In this temperature control operation, wavelength shifting is carried out at the AWG device 221*d* of the OXC node 220 and the AWG device of the OADM node 207, so that a flattening operation is performed at the center wavelength.

The OSC unit 225*b* notifies the OADM node 202 that the feedback AWG temperature control operations of steps S21 and S22 have been completed.

With respect to the optical channel CH2, the error correction amount information is sent to the combining filter temperature control unit 224*b*, the branching filter temperature control unit 224*c*, and the combining filter temperature control unit of the OADM node 206, via the OSC unit of the OADM node 202, the OSC unit 225*b*, the OSC unit 225*c*, and the OSC unit of the OADM node 206 in this order.

[S25] The combining filter temperature control unit of the OADM node 206 and the branching filter temperature control unit 224*c* of the OXC node 220 perform a feedback AWG temperature control operation for the section 3. In this temperature control operation, wavelength shifting is carried out at the AWG device of the OADM node 206 and the AWG device 221*c* of the OXC node 220, so that a flattening operation is performed at the center wavelength.

[S26] The combining filter temperature control unit 224*b* and the branching filter temperature control unit of the OADM node 202 perform a feedback AWG temperature control operation for the section 2. In this operation, wavelength shifting is carried out at the AWG device 221*b* of the OXC node 220 and the AWG device of the OADM node 202, so that a flattening operation is performed at the center wavelength.

[S27] The OSC unit 225*b* notifies the OADM node 202 that the feedback AWG temperature control operations of steps S25 and S26 have been completed. The above procedures are repeated thereafter for the sections 5 through 8 of the OXC node 230.

As described so far, according to the present invention, the transmission characteristics can be improved in the entire network. Especially, the transmission quality can be improved by reducing waveform deterioration in a network in which a plurality of AWG devices are connected.

Also, according to the present invention, the transmission quality can be improved at a low cost, without an increase of the precision of each AWG device (the precision of the flat characteristics can be increased by employing a plurality of optical filters, but, in doing so, the loss of each AWG becomes greater, resulting in higher costs).

Although the optical transmission system 1 is applied to an optical ring network in the above description, the optical transmission system 1*a* shown in FIG. 11 may also be applied to an optical ring network. Further, the present invention can be applied not only to optical networks mainly including ring networks, but also to networks of other various configurations such as linear networks and mesh networks.

As described so far, in an optical transmission system according to the present invention, the optical reception device gathers the error correction amount information of optical signals, and sets a branching filter operation temperature. The optical reception device then shifts the wavelength transmission band in the short-wavelength direction or the long-wavelength direction, thereby performing a branching operation. Meanwhile, the optical transmission device sets a combining filter operation temperature based on the error correction amount, and shifts the wavelength transmission band in the opposite direction from the shifting direction of the optical reception device, thereby performing a combining operation. In this manner, the accumulated distortions caused in the vicinity of the center wavelength of the AWG unit wavelength can be reduced and flattened as a whole. Thus, the transmission quality can be improved at a low cost, without having to increase the precision of the transmission characteristics of each AWG device.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An optical transmission system that performs WDM optical transmission, comprising:

an optical transmission device that includes: a transmission transponder that performs encoding on an error correction code for an optical signal at each wavelength; an optical wavelength combining unit that shifts a wavelength transmission band in the opposite direction from the shifting direction on a reception side based on a combining filter operation temperature, so as to perform a combining operation on optical signals and output a wavelength-multiplexed optical signal; and a combining filter temperature control unit that sets the combining filter operation temperature based on an error correction amount sent from the reception side; and an optical reception device that includes: an optical wavelength branching unit that shifts a wavelength transmission band in a short-wavelength direction or a long-wavelength direction based on a branching filter operation temperature, so as to perform a branching operation on a wavelength-multiplexed optical signal; a reception transponder that performs decoding on an error correction code for an optical signal at each wavelength; an error correction monitoring unit that gathers an error correction amount from the reception transponder; and a branching filter temperature control unit that sets the branching filter operation temperature based on the gathered error correction amount.

2. The optical transmission system according to claim 1, wherein:

the error correction monitoring unit stores the smallest value of the error correction amount; and the branching filter temperature control unit and the combining filter temperature control unit set an operation temperature at an optimum value based on the smallest value, so as to flatten the transmission characteristics of an optical signal.

3. The optical transmission system according to claim 1, wherein:
the optical reception device further includes an optical level measuring unit that measures the optical level of an optical signal at each wavelength, generates optical level information, and transmits the optical level information to the optical transmission device; and
the optical transmission device further includes an optical variable attenuator and an optical level control unit that adjusts the attenuation of the optical variable attenuator in accordance with the optical level information, so that an optical level change due to a non-linear effect of a fiber-optic cable and an optical level loss of a flat top type AWG device can be compensated.

4. An optical reception device that receives an optical signal, comprising:
an optical wavelength branching unit that shifts a wavelength transmission band in a short-wavelength direction or a long-wavelength direction based on a branching filter operation temperature, and performs a branching operation on a wavelength-multiplexed optical signal;
a reception transponder that performs decoding on an error correction code for an optical signal at each wavelength;
an error correction monitoring unit that gathers an error correction amount from the reception transponder; and
a branching filter temperature control unit that sets the branching filter operation temperature based on the error correction amount.

5. An optical transmission device that transmits an optical signal, comprising:
a transmission transponder that performs encoding on an error correction code for an optical signal at each wavelength;
an optical wavelength combining unit that shifts a wavelength transmission band in the opposite direction from the shifting direction of an optical reception device based on a combining filter operation temperature when a wavelength transmission band is shifted in a short-wavelength direction or a long-wavelength direction on the side of the optical reception device, the optical wavelength combining unit thereby performing a combining operation on optical signals and outputting a wavelength-multiplexed optical signal; and
a combining filter temperature control unit that sets the combining filter operation temperature based on the error correction amount sent from the optical reception device.

6. An optical network system that performs WDM optical transmission, comprising:
a node that includes: an optical transmission unit including a transmission transponder that performs encoding on an error correction code for an optical signal at each wavelength, an optical wavelength combining unit that shifts a wavelength transmission band in the opposite direction from the shifting direction on a reception side based on a combining filter operation temperature so as to perform a combining operation on optical signals and output a wavelength-multiplexed optical signal, and a combining filter temperature control unit that sets the combining filter operation temperature based on an error correction amount sent from the reception side; and an optical reception unit including an optical wavelength branching unit that shifts a wavelength transmission band in a short-wavelength direction or a long-wavelength direction based on a branching filter operation temperature so as to perform a branching operation on a wavelength-multiplexed optical signal, a reception transponder that performs decoding on an error correction code for an optical signal at each wavelength, an error correction monitoring unit that gathers an error correction amount from the reception transponder, and a branching filter temperature control unit that sets the branching filter operation temperature based on the gathered error correction amount,
the node performing either an OADM control operation to carry out "Add"/"Drop" on an optical signal or an optical cross-connect control operation; and
an optical transmission medium that connects a plurality of nodes, each of which is the same type as said node.

7. An optical transmission method for performing WDM optical transmission control, comprising the steps of:
gathering an error correction amount by decoding an error correction code for an optical signal at each wavelength on a transmission side;
setting a branching filter operation temperature based on the error correction amount;
performing a branching operation on a wavelength-multiplexed optical signal by shifting a wavelength transmission band in a short-wavelength direction or a long-wavelength direction based on the branching filter operation temperature;
setting a combining filter operation temperature based on the error correction amount; performing a combining operation on optical signals to output a wavelength-multiplexed optical signal, by shifting a wavelength transmission band in the opposite direction from the shifting direction on a reception side based on the combining filter operation temperature;
storing the smallest value of the error correction amount; and
flattening the transmission characteristics of an optical signal by shift-setting an operation temperature at an optimum value based on the smallest value.

* * * * *